(12) United States Patent
Saitoh

(10) Patent No.: US 8,567,276 B2
(45) Date of Patent: Oct. 29, 2013

(54) ENGINE UNIT, AND MOTORCYCLE EQUIPPED THEREWITH

(75) Inventor: Tetsushi Saitoh, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 1034 days.

(21) Appl. No.: 12/609,585

(22) Filed: Oct. 30, 2009

(65) Prior Publication Data

US 2010/0108422 A1 May 6, 2010

(30) Foreign Application Priority Data

Oct. 30, 2008 (JP) ................................ 2008-280588

(51) Int. Cl.
*F16H 3/38* (2006.01)

(52) U.S. Cl.
USPC .......................................................... 74/340

(58) Field of Classification Search
USPC .............. 74/329, 330, 331, 335, 340, 606 R; 123/197.1–197.5, 195 C, 198 E
See application file for complete search history.

(56) References Cited

U.S. PATENT DOCUMENTS

| | | | | | |
|---|---|---|---|---|---|
| 1,360,110 | A | * | 11/1920 | Harley ............................ | 74/325 |
| 4,223,567 | A | * | 9/1980 | Onda ........................... | 74/606 R |
| 4,339,964 | A | * | 7/1982 | Isaka ........................... | 74/606 R |
| 4,606,310 | A | * | 8/1986 | Makino ....................... | 123/192.2 |
| 6,364,797 | B1 | * | 4/2002 | Ikusue et al. .................. | 474/148 |
| 6,715,376 | B2 | * | 4/2004 | Hojyo et al. .................... | 74/414 |
| 7,198,021 | B2 | * | 4/2007 | Kawakubo et al. ........ | 123/198 P |
| 7,363,904 | B2 | * | 4/2008 | Utsumi et al. ............ | 123/196 R |
| 7,690,367 | B2 | * | 4/2010 | Togasawa ...................... | 123/572 |
| 7,779,727 | B2 | * | 8/2010 | Mukouhara et al. ........ | 74/606 R |
| 7,845,246 | B2 | * | 12/2010 | Tsukada et al. .................. | 74/330 |
| 8,286,523 | B2 | * | 10/2012 | Hayakawa et al. ............. | 74/335 |
| 2004/0255897 | A1 | * | 12/2004 | Arakawa .................... | 123/197.5 |

(Continued)

FOREIGN PATENT DOCUMENTS

| | | | |
|---|---|---|---|
| AT | 503 476 A1 | 10/2007 |
| EP | 1 403 559 A2 | 3/2004 |

(Continued)

OTHER PUBLICATIONS

Saitoh, "Twin Clutch Transmission, and Vehicle and Motorcycle Equipped Therewith," U.S. Appl. No. 12/609,534, filed Oct. 30, 2009.

(Continued)

*Primary Examiner* — Troy Chambers
*Assistant Examiner* — Michael Gonzalez
(74) *Attorney, Agent, or Firm* — Keating & Bennett, LLP

(57) ABSTRACT

An engine unit includes a multi-speed transmission provided with a plurality of clutches, and enables assembly and maintenance of clutches and a sprocket wound with a drive chain to be easily performed. In an engine unit chassis, a drive shaft arranged to output a drive to a rear wheel via a sprocket provided at one end in the lateral direction, and a second main shaft are arranged parallel or substantially parallel to a crankshaft provided in approximately a lateral direction of the vehicle. A second clutch that transfers rotation power from the crankshaft to the second main shaft is detachably connected to one of the second main shaft, which projects from the engine unit chassis beyond one end of the drive shaft, in a position to overlap with at least portion of the sprocket axially sideways with respect to the drive shaft.

6 Claims, 15 Drawing Sheets

(56) References Cited

U.S. PATENT DOCUMENTS

| | | |
|---|---|---|
| 2005/0229894 A1* | 10/2005 | Okano et al. ............... 123/197.1 |
| 2007/0272195 A1* | 11/2007 | Keyaki et al. ............. 123/196 R |
| 2007/0295159 A1* | 12/2007 | Nishi et al. ................. 74/606 R |
| 2008/0087119 A1* | 4/2008 | Shiozaki ........................ 74/330 |
| 2009/0084210 A1* | 4/2009 | Tsukada et al. ................ 74/330 |

FOREIGN PATENT DOCUMENTS

| | | |
|---|---|---|
| EP | 1 906 056 A1 | 4/2008 |
| JP | 58-124851 A | 7/1983 |
| JP | 58-203252 A | 11/1983 |
| JP | 06-081670 A | 3/1994 |
| WO | 2009/000755 A2 | 12/2008 |

OTHER PUBLICATIONS

Saitoh et al., "Twin Clutch Transmission, and Vehicle Equipped Therewith," U.S. Appl. No. 12/609,544, filed Oct. 30, 2009.

Saitoh, "Shift Mechanism, and Vehicle Equipped Therewith," U.S. Appl. No. 12/609,591, filed Oct. 30, 2009.

Official Communication issued in corresponding European Patent Application No. 09013722.5, mailed on Mar. 2, 2010.

* cited by examiner

ENGINE UNIT, AND MOTORCYCLE EQUIPPED THEREWITH

CROSS REFERENCE TO RELATED APPLICATIONS

This application is entitled to and claims the benefit of Japanese Patent Application No. 2008-280588, filed on Oct. 30, 2008, the disclosure of which including the specification, drawings and abstract is incorporated herein by reference in its entirety.

BACKGROUND OF THE INVENTION

1. Field of the Invention

The present invention relates to an engine unit and a motorcycle equipped therewith.

2. Description of the Related Art

Heretofore, a general motorcycle has been known that, due to its limited mounting space, has an engine crankshaft placed in a lateral direction, and has a clutch and a main shaft placed on an axis parallel to the crankshaft. The clutch is connected to one end of the main shaft and transfers power from the crankshaft to the main shaft. Power that is transferred to the main shaft is transferred to a counter shaft (output shaft) that is placed opposite and parallel to the main shaft via a gear mission, and is output to the rear wheel via a drive chain wound around a sprocket attached to one end of the counter shaft. The sprocket is wound by a chain with a gear that rotates the rear wheel and therefore is attached to one end of the counter shaft after an engine unit is mounted on a vehicle with front and rear wheels.

Thus, a sprocket is attached to a counter shaft after an engine unit is mounted on a vehicle, and therefore a clutch that is placed in advance in the engine unit, coaxially with a main shaft placed at a short distance in the front-back direction from the countershaft, is attached to the other end (in the lateral direction) of the end to which the sprocket is attached.

Heretofore, a transmission has been known that is equipped with a plurality of clutches in order to make possible speedy transmission operations of an automobile (see Unexamined Japanese Patent Publication No. SHO58-124851, for example).

Recently, there is a demand for mounting a multi-speed transmission provided with a plurality of clutches and generally mounted on a vehicle, on a motorcycle having limited mounting space. When a multi-speed transmission equipped with a plurality of clutches is mounted on a motorcycle, it is necessary to reduce the size of the transmission itself, and, in addition, due to the structure of the motorcycle on which the transmission is mounted, it is necessary to position the center of gravity approximately centrally in the vehicle width direction together with the mounted engine and create a weight balance that is not biased toward the left or right.

A clutch is a member in the drive transmission system and is comparatively heavy. Consequently, for a multi-speed transmission to be mounted on a conventional motorcycle, there is a demand for positioning a plurality of clutches both to the left and right with respect to a counter shaft and a main shaft that is parallel to the counter shaft, in order to maintain the lateral balance of the transmission itself. That is to say, for a transmission in which a main shaft is placed parallel to a counter shaft at a short distance in the front-back direction, there is a demand for placing one clutch on an extension of one end of a countershaft to which a sprocket is attached.

In other words, there is a demand for an engine unit whereby, even if a clutch and a sprocket that is wound with a drive chain are positioned close on the same side with respect to the center axis of a vehicle on which a transmission is mounted, the sprocket can be attached to a counter shaft after the engine unit is mounted on the vehicle.

SUMMARY OF THE INVENTION

Preferred embodiments of the present invention provide an engine unit that enables a multi-speed transmission provided with a plurality of clutches to be made small and that enables the assembly and maintenance of clutches and a sprocket wound by a drive chain to be performed easily.

According to a preferred embodiment of the present invention, an engine unit includes a crankshaft arranged in an approximately lateral direction of a vehicle in which the engine unit is mounted; an output shaft arranged parallel or substantially parallel to the crankshaft and arranged to output a drive to a driving wheel via a sprocket provided at one end in the lateral direction; a main shaft section aligned parallel or substantially parallel to the output shaft, and arranged to rotate by rotation power transferred from the crankshaft and to provide output to the output shaft via a transmission gear mechanism; a clutch arranged to connect and disconnect the rotation power transferred from the crankshaft to the main shaft; and a drive unit case in which the crankshaft, the main shaft, the transmission gear mechanism, and the output shaft are provided in a rotatable fashion. Preferably, in the engine unit, the main shaft section is provided in the drive unit case such that one end of the main shaft section projects from the drive unit case toward the one end of the output shaft, beyond the one end of the main shaft; and the clutch is detachably connected to the one end of the main shaft section in a position to overlap with at least a portion of the sprocket axially sideways with respect to the output shaft.

Furthermore, another preferred embodiment of the present invention provides a motorcycle equipped with an engine unit having the above configuration.

According to the preferred embodiments of the present invention, it is possible to minimize the size of a multi-speed transmission provided with a plurality of clutches, and, even if clutches and a sprocket wound with a drive chain are placed close on the same side with respect to the center axis of a vehicle, maintenance of clutches and sprocket is easily performed.

Other features, elements, steps, characteristics and advantages of the present invention will become more apparent from the following detailed description of preferred embodiments of the present invention with reference to the attached drawings.

DETAILED DESCRIPTION OF THE PREFERRED EMBODIMENTS

With reference now to the accompanying drawings, preferred embodiments of the present invention will be explained in detail below. According to a preferred embodiment, a vehicle equipped with a transmission will be described as a motorcycle. Also, the terms front, rear, left, and right in the various preferred embodiments mean front, rear, left, and right from the viewpoint of the rider seated on the seat of the above motorcycle.

A transmission in an engine unit of the present preferred embodiment is equipped with a plurality of friction drive clutches that implement seamless gear changing by performing power transfer alternately between odd-numbered gears and even-numbered gears, and is mounted on a motorcycle as a vehicle, together with the engine. First, an outline description will be given of a motorcycle on which an engine unit having a transmission is mounted.

(1) Configuration of Motorcycle

Figure 1:
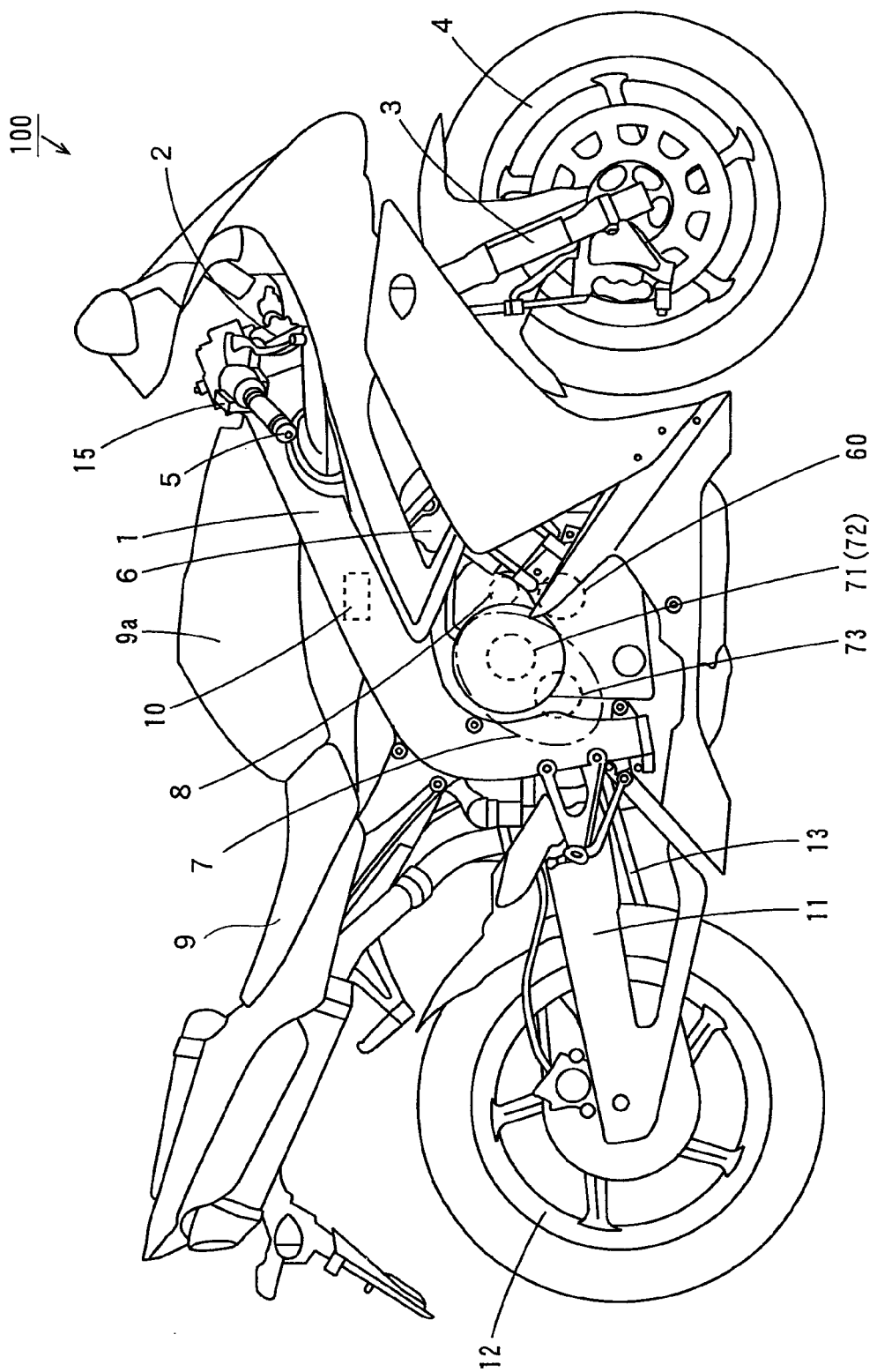
FIG. 1 is a side view of a vehicle equipped with an engine unit according to a preferred embodiment of the present invention.

FIG. 1 is a side view of a vehicle equipped with an engine unit according to a preferred embodiment of the present invention.

As shown in FIG. 1, motorcycle 100 is equipped with main frame 1 that is provided with head pipe 2 at the front end, and that extends toward the rear while sloping downward, and in which an engine unit including engine 6, transmission 7, motor 8, and so forth, is located internally. Front fork 3, to which handle 5 is attached at the top, is provided on head pipe 2 in a rotatable fashion, and supports front wheel 4 attached rotatably at the lower end of this front fork 3.

The handle 5 is provided with shift switch 15 that causes a gear change operation by transmission 7 of the engine unit (see FIG. 2) by an operation by the rider. Shift switch 15 has a shift-up button and shift-down button (not shown). When the shift-up button is depressed by the rider, transmission 7 executes a shift-up operation, and when the shift-down button is depressed by the rider, transmission 7 executes a shift-down operation.

In the engine unit placed inside main frame 1, engine 6 is provided in approximately the center portion of the vehicle, with crankshaft 60 extending approximately horizontally in a direction (a lateral direction) perpendicular or substantially perpendicular to the front-back direction of the vehicle below the cylinder head. At the rear of engine 6, transmission 7 is provided that is connected to crankshaft 60 and uses power input via crankshaft 60. Between engine 6 and transmission 7, motor 8 is provided that causes a gear shift by transmission 7, and this motor 8 performs a gear shift by rotary driving of shift cam 14 of shift mechanism 701 of transmission 7 (see FIG. 2).

Rear arm 11 is joined and extends rearward from the rear end of main frame 1, sloping downward. Rear arm supports rear wheel 12 and a driven sprocket (not shown) in a rotatable fashion.

On motorcycle 100, seat 9 and fuel tank 9a are placed above the engine unit, and ECU (Electronic Control Unit) 10 that controls the operation of the elements of motorcycle 100 is placed between seat 9 and fuel tank 9a, and the engine unit. The ECU 10 controls the operation of twin clutch transmission 7 equipped with two friction drive clutches that perform odd-numbered and even-numbered transmission gear (transmission gear mechanism) power transfer respectively, for a single engine.

In the vehicle, transmission 7 is arranged such that the center in the lateral direction of transmission mechanism 700 and the center in the lateral direction of motorcycle 100 are close to each other.

(2) Configuration of Transmission

Figure 2:
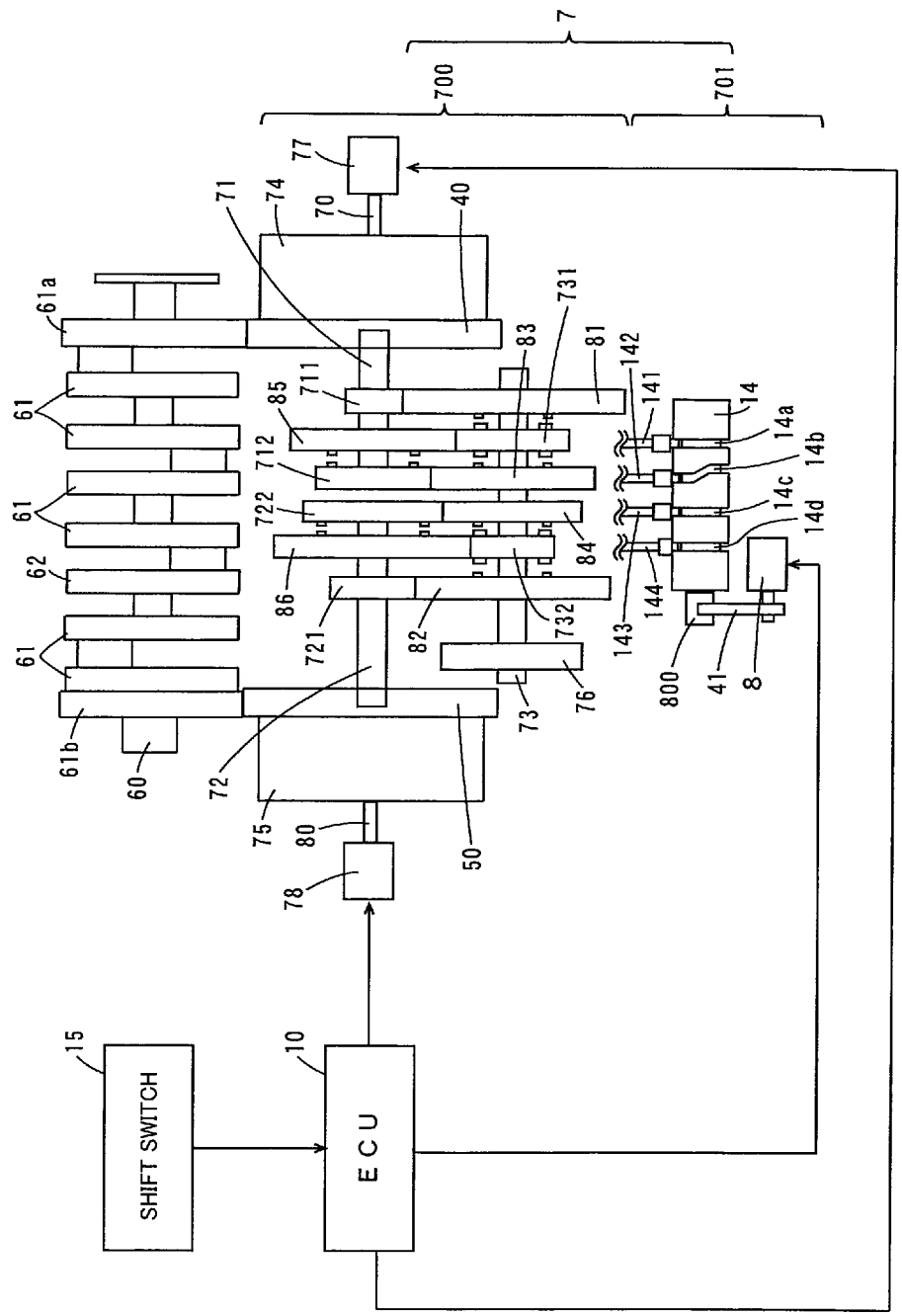
FIG. 2 is a schematic diagram explaining the configuration of the engine unit in FIG. 1.

FIG. 2 is a schematic diagram explaining the configuration of engine unit 7 in FIG. 1, and, more specifically, is a schematic diagram of an engine unit including the transmission. The engine unit is omitted from FIG. 2.

Transmission 7 shown in FIG. 2 is connected to crankshaft 60 of engine 6, and includes a transmission mechanism 700 that varies torque transferred from crankshaft 60 and transfers it to the rear wheel 12, and shift mechanism 701 that performs various operations in transmission mechanism 700.

Transmission mechanism 700 has first main shaft 71, second main shaft 72, and drive shaft (output shaft) 73, placed parallel or substantially parallel to crankshaft 60 which is arranged approximately horizontally in a direction perpendicular or substantially perpendicular to the vehicle, first clutch 74, second clutch 75, gears 81 through 86, 711, 712, 721, 722, 731, and 732 that perform power transfer between shafts 71 through 73, drive sprocket (hereinafter referred to as "sprocket") 76, first and second clutch actuators 77 and 78, and so forth.

In transmission mechanism 700, output transferred to first and second main shafts 71 and 72 is transferred to drive shaft 73 located toward the rear by selecting gears 81 through 86, 711, 712, 721, 722, 731, and 732 as appropriate. Sprocket 76 is fixed to one end (the left end) of drive shaft 73, and drive chain 13 wound around a gear provided on a rotating shaft of rear wheel 12 is wound around this sprocket 76. Driving force is transferred to rear wheel (driving wheel) 12 via drive chain 13 through the rotation of sprocket 76 due to the rotation of drive shaft 73.

The transmitting portion of a driving force output to rear wheel 12 via odd-numbered transmission gears (gears 81, 83, 85, 711, 712, and 731) on first main shaft 71, and the transmitting portion of a driving force output to rear wheel 12 via even-numbered transmission gears (gears 82, 84, 86, 721, 722, and 732) on second main shaft 72, preferably have approximately the same outer diameter. Also, the driving force transmitting portion in first main shaft 71 and the driving force transmitting portion in second main shaft 72 are placed not to overlap concentrically. In the transmission mechanism 700, first main shaft 71 and second main shaft 72 preferably having the same outer diameter are placed side by side laterally on the same axis line, and rotate independently of each other.

First main shaft 71 is coupled to first clutch 74, and second main shaft 72 is coupled to second clutch 75. First clutch 74 and second clutch 75 are spaced a distance from each other in a direction (here, the lateral direction) perpendicular or substantially perpendicular to the front-back direction of the vehicle.

First clutch 74 has its operation controlled by ECU 10 via first clutch actuator 77, and performs power transfer of odd-numbered gears including a group of odd-numbered gears (first gear 81, third gear 83, and fifth gear 85). Second clutch 75 has its operation controlled by ECU 10 via second clutch actuator 78, and performs power transfer of even-numbered gears including a group of even-numbered gears (second gear 82, fourth gear 84, and sixth gear 86).

Gear shifting performed for gears 81 through 86, 711, 712, 721, 722, 731, and 732 in transmission mechanism 700 is performed by shift forks 141 through 144 that are movable by the rotation of shift cam 14 in shift mechanism 701.

Thus, in motorcycle 100 using transmission 7, engine 6 driving force from crankshaft 60 is output from two independent systems having first and second clutches 74 and 75, and first main shaft 71 and second main shaft 72, is transferred to a driven sprocket via chain 13, and rotates rear wheel 12.

Transmission mechanism 700 of transmission 7 will now be described in detail.

(2-1) Transmission Mechanism of Transmission

Figure 3:
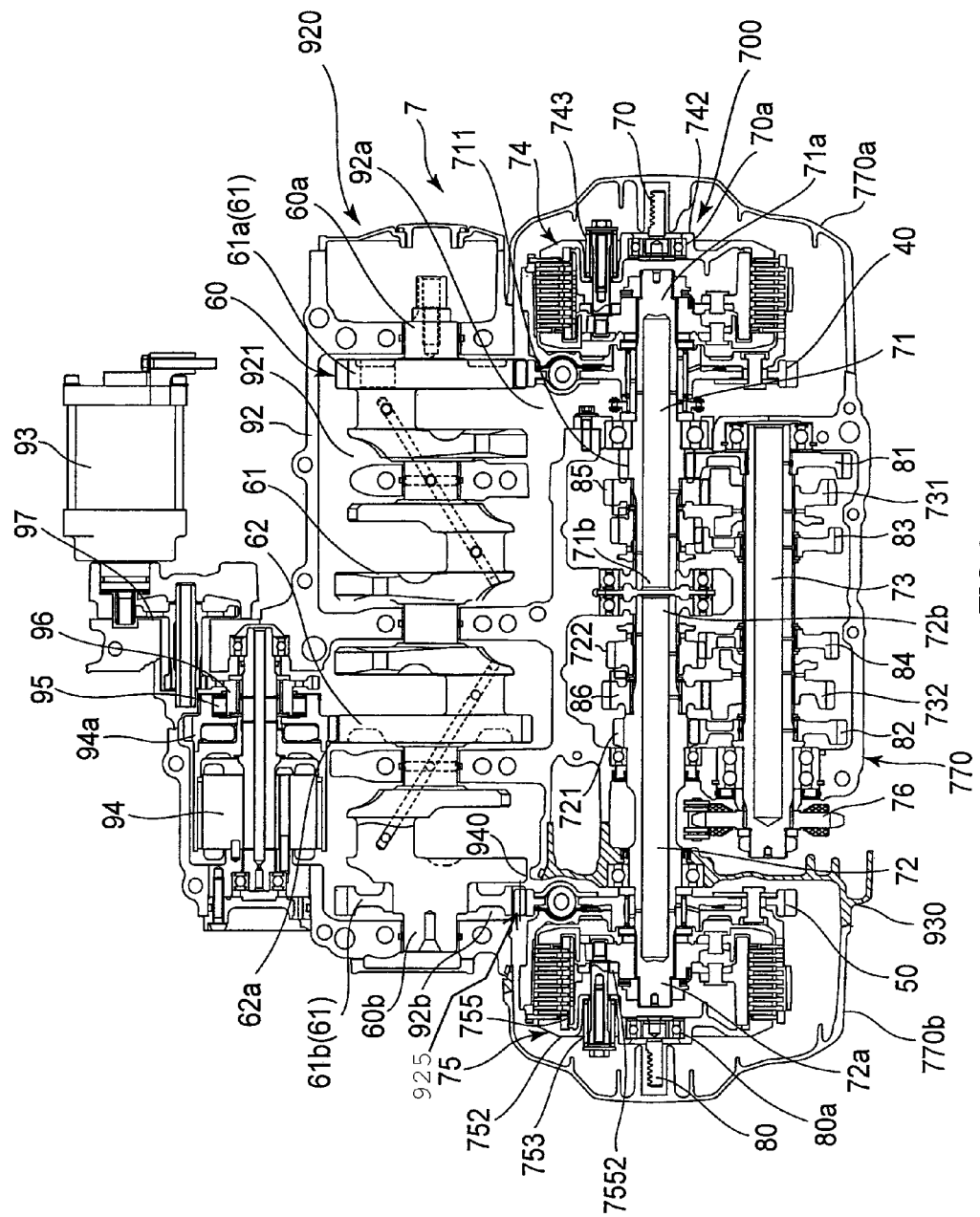
FIG. 3 is a drawing provided to explain the transmission shown in FIG. 1.

FIG. 3 is a drawing provided to explain the transmission shown in FIG. 1, being a partial cross-sectional plan view showing the principal portions of an engine unit equipped with a transmission. For convenience, hatching indicating a cross-section of various elements is omitted in FIG. 3.

Transmission mechanism 700 of transmission 7 is placed in an area in which crankshaft 60 is adjacent to shaft accommodating section 921 arranged to face in a lateral direction in crank case 92 of the drive unit, and that includes mission case (also referred to as "unit case") 770 arranged in the lengthwise direction of shaft accommodating section 921.

Mission case 770 forms engine unit chassis (drive unit case) 920 together with shaft accommodating section 921 and crank case 92.

Clutch cover (side cover section) 770a, bell housing 930, and clutch cover (side cover section) 770b are attached to this drive unit case 920. Clutch cover (side cover section) 770a is detachably attached to one side surface (the right side surface) of mission case 770 in drive unit case 920, and covers first clutch 74 from one side (the right side). Clutch cover (side cover section) 770b is provided detachably on the other side of bell housing 930 so as to cover that bell housing 930, and covers second clutch 75 from the other side (the left side).

Mission case 770 is arranged parallel or substantially parallel to the direction in which shaft accommodating section 921 extends in crank case 92. Mission case 770 accommodates portions of first and second main shafts 71 and 72, drive shaft 73, and gears through 86, 711, 712, 721, 722, 731, and 732.

Clutch covers 770a and 770b are preferably each arranged in a bell shape, and cover first clutch 74 and second clutch 75 from both sides (the left and right sides) of crank case 92.

Of clutch covers 770a and 770b, one (left side) clutch cover 770a is detachably attached to one side surface (here, the right side surface) of mission case 770, and together with this one side surface, defines a clutch case that accommodates first clutch 74.

Also, clutch cover 770b, together with bell housing 930 detachably attached to the other side surface (the left side surface) of mission case 770, defines a clutch case (casing material) that accommodates second clutch 75. For convenience, bell housing 930 is shown hatched in FIG. 3.

Starter motor 93 is attached to crank case 92 of engine unit case 920, and idler gear 97 and starter gear are driven by this starter motor 93.

Gear 94a is connected to gear 62a provided on crank web 62 of crankshaft 60, and is also connected to starter gear 96 rotated by the drive of starter motor 93 via one-way clutch 95. As a result of this structure and arrangement, when starter motor 93 drives, gear 94a rotates integrally with starter gear 96 via one-way clutch 95, and rotates crankshaft 60.

Generator 94 is attached to crank case 92, and this generator 94 rotates integrally with gear 94a. As stated above, gear 94a is connected to gear 62a provided on crank web 62 of crankshaft 60. Thus, generator 94 is driven when crankshaft 60 rotates.

As shown in FIG. 2 and FIG. 3, crankshaft 60 of engine 6 (FIG. 1) has a plurality of crank webs 61 and 62. As shown in FIG. 3, crankshaft 60 is placed inside shaft accommodating section 921 of crank case 92 in such a way that the center portion in the direction of extension is approximately in the center in the vehicle width direction.

Of the plurality of crank webs 61 in crankshaft 60, crank webs 61a and 61b located at one end and the other end of crankshaft 60 are external gears on which gear grooves are arranged on the outer periphery. These crank webs 61a and 61b are located at positions facing the inside of both clutch cases (clutch covers 770a and 770b) from openings 92a and 92b that open on the first clutch and second clutch 75 sides (here, rearward) on both sides (both sides axially) of crank case 92 in shaft accommodating section 921.

Of crank webs 61a and 61b on which gear grooves are provided in crankshaft 60, crank web 61a provided at one end meshes with first primary driven gear (also referred to as "first input gear") 40 in first clutch 74 inside shaft accommodating section 921. Through this meshing, power transferred to first input gear 40 from crank web 61a at one end of crankshaft 60 is transferred to first main shaft 71 of transmission 7 from one end of crankshaft 60 via first clutch 71.

On the other hand, of crank webs 61a and 61b on which gear grooves are provided in crankshaft 60, crank web 61b provided at the other end meshes with second primary driven gear (also referred to as "second input gear") 50 in second clutch 75 inside the clutch case. Through this meshing, power transferred to second input gear 50 from crank web 61b at the other end of crankshaft 60 is transferred to second main shaft 72 of transmission from the other end of crankshaft 60.

A meshing portion between gear grooves of crank web 61b and second input gear 50 is placed in a communicating portion that communicates inside the clutch case at the other end (the left end) of shaft accommodating section 921 in engine unit case 920. This communicating portion is defined by an opening 92b at the other end of shaft accommodating section 921 and throughhole 940 disposed in a junction section of bell housing 930 forming the clutch case. That is, throughhole 940 is formed by penetrating a junction section 925 between the bottom surface of bell housing 930 (partition member) and drive unit case 920, and a power transmitting portion that meshes with the input gear and transfers rotation power from the crankshaft 60 side is located here.

First clutch 74 and second clutch 75 are placed rearward of crankshaft 60, and opposite the two ends 60a and 60b of crankshaft 60, respectively. Base end 71a of first main shaft 71 is coupled to first clutch 74, and base end 72a of second main shaft 72 is coupled to second clutch 75.

First main shaft 71 and second main shaft 72 extend in mutually opposite directions from first clutch and second clutch 75, and are placed in a direction (here, a lateral direction) intersecting the front-back direction of motorcycle 100 approximately at a right angle.

First and second main shafts 71 and 72 are placed so as to position the end surface portions of mutually opposite front ends 71b and 72b approximately in the center in the vehicle width direction of motorcycle 100 in drive unit case 920 of the engine unit.

Specifically, the front end (other end) 71b side of first main shaft 71 and the front end (other end) 72b side of second main shaft 72 are inserted into hollow mission case 770 connected to crank case 92 of the engine unit. Here, first main shaft 71 and second main shaft 72 are placed in unit chassis 922 with the respective base end (one end) 71a/72a sides projecting left and right from both sides of mission case 770.

On the same axis line, mutually facing first main shaft 71 front end 71b and second main shaft 72 front end 72b are inserted into bearings 771 and 772 inside mission case 770, and are rotatable. These bearings 771 and 772 fit inside an opening in flange 773 that extends from the inner peripheral surface of mission case 770.

Flange 773 rotatably supports the end surfaces of front ends 71b and 72b of first main shaft 71 and second main shaft 72 via bearings 771 and 772 so as to face each other in the center portion of the flange 773.

Front ends 71b and 72b of first main shaft 71 and second main shaft 72 are rotatable in crank case 92 by being inserted into bearings 771 and 772 inside flange 773 inside mission case 770, but this is not a limitation. For example, it is possible in which only one or the other of front ends 71b and 72b of hollow first main shaft 71 and second main shaft 72 is received by a bearing inside a flange provided inside mission case 770. With this configuration, it is possible that a needle bearing is attached to the inner periphery of one or the other of front ends 71b and 72b, and the other one of front ends 71b and 72b is inserted into this needle bearing. That is to say, the other end of adjacent ends is inserted rotatably into one end in coaxially aligned first main shaft 71 and second main shaft 72, and the one end only is supported in flange 773 extending from the mission case 770 via a bearing. To summarize, of two main shafts placed on the same axis, an end of one main shaft is inserted into an end of the other main shaft, and only that end of the one main shaft is supported rotatably inside mission case 770. According to this configuration, if both main shafts are hollow and the respective hollow portions include lubricating oil channels, lubricating oil can be made to flow satisfactorily inside both main shafts simply by providing an inflow of lubricating oil at an end at which the two main shafts overlap, or a point near that end.

Figure 4:
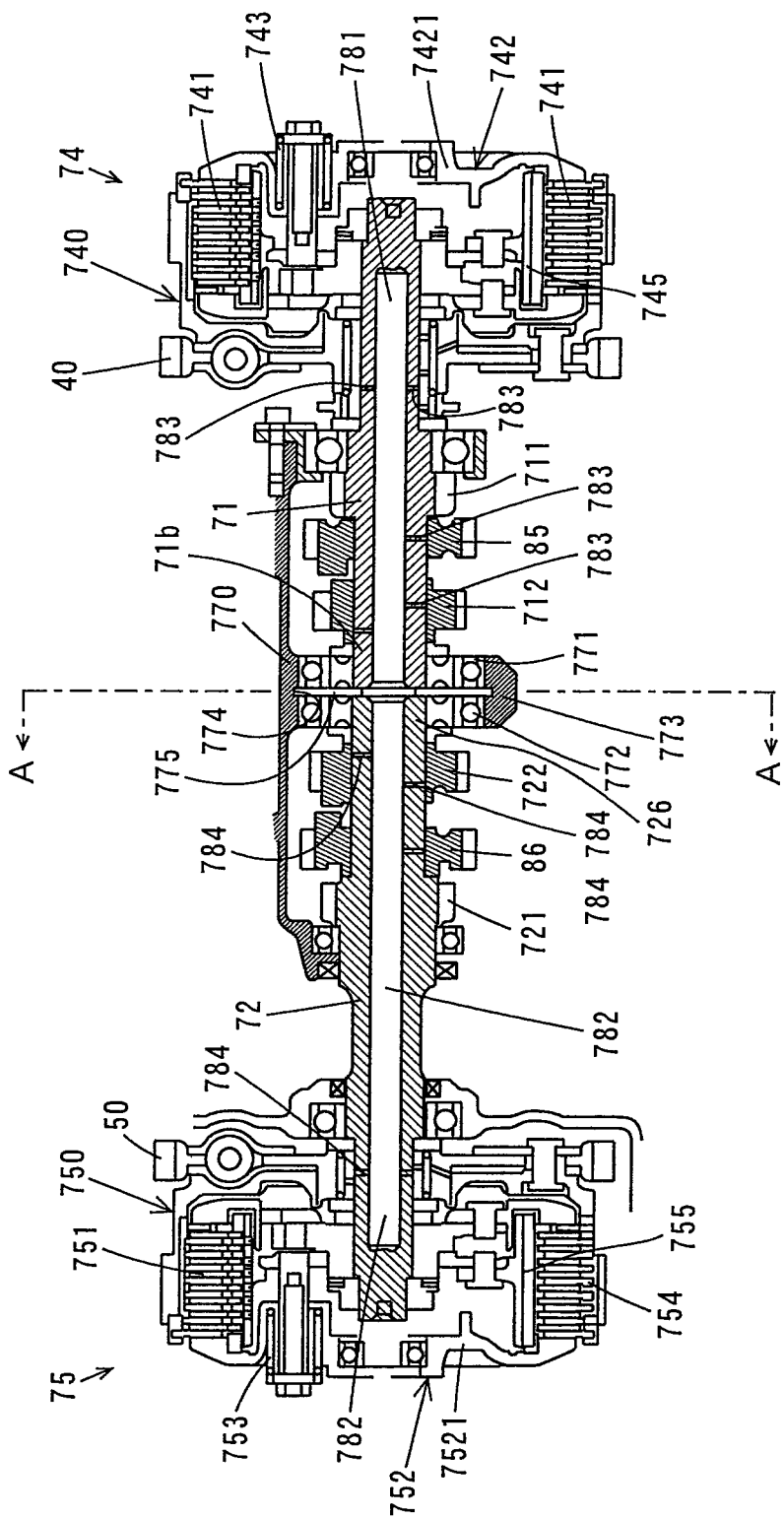
FIG. 4 is a principal-portion cross-sectional view showing first and second clutches and first and second main shafts.

FIG. 4 is a principal-portion cross-sectional view showing first and second clutches 74 and 75 and first and second main shafts 71 and 72.

First main shaft 71 and second main shaft 72 have internal cavities 781 and 782 respectively that extend in the axial direction and open at one end as shown in FIG. 4. In this case, cavity 781 opens at the front end of first main shaft 71, and cavity 782 opens at one end (here, the front end) of second main shaft 72.

Also, a plurality of throughholes 783 communicating between cavity 781 and the exterior of first main shaft 71 are provided in first main shaft 71, and a plurality of throughholes 784 communicating between cavity 782 and the exterior of second main shaft 72 are provided in second main shaft 72.

Flange 773 placed inside mission case 770 has ring-shaped groove 774 in the center portion in the axial direction in the inner peripheral surface of the opening, fitting inside bearings 771 and 772. Also, lubricating oil supply path 775 is provided in flange 773 so as to communicate with groove 774.

Lubricating oil supply path 775 is connected to a lubricating oil supply source (not shown). With this configuration, lubricating oil supplied to lubricating oil supply path 775 from the lubricating oil supply source is supplied to the space inside flange 773 from one end of lubricating oil supply path 775.

Lubricating oil supplied inside flange 773 flows from one end of first main shaft 71 and one end of second main shaft 72, into cavity 781 and cavity 782. Lubricating oil that has flowed into cavity 781 is supplied to the interior of first clutch 74 and the outer periphery of first main shaft 71 via plurality of throughholes 783. As a result of this structure and arrangement, a rise in temperature of first clutch 74 is prevented, and fixed gear 711, fifth gear 85, and spline gear 712 are lubricated. Also, lubricating oil that has flowed into cavity 782 is supplied to the interior of second clutch 75 and the outer periphery of second main shaft 72 via plurality of throughholes 784. As a result of this structure and arrangement, a rise in temperature of second clutch 75 is prevented, and spline gear 722, sixth gear 86, and fixed gear 721 are lubricated.

Of the ends of first and second main shafts 71 and 72 placed on the same axis line in this way, first clutch 74 and second clutch 75 are placed at ends (base ends) 71a and 72a on the sides farthest from each other in a lateral direction.

These first and second clutches 74 and 75 are connected outwardly from the axis to base end (one end) 71a and base end (one end) 72a of first and second main shafts 71 and 72 projecting axially outward from both side surfaces of mission case 770, as shown in FIG. 3 and FIG. 4. Base end 72a of second main shaft 72 projects farther axially outward than the other side surface of mission case 770 and bell housing 930 detachably attached to the other side surface, and is positioned farther axially outward than the same-side (left-side) end of adjacent drive shaft 73.

First clutch 74 is placed farther axially outward than one side surface of mission case 770, and is covered by clutch cover 770a detachably attached to one side surface (one side surface in a direction approximately perpendicular or substantially perpendicular to horizontal with respect to the vehicle center axis).

Second clutch 75 is placed farther axially outward than the other side surface of mission case 770 and bell housing 930 detachably attached to the other side surface, and is covered, axially from the outside, by clutch cover 770b.

Second clutch 75 is connected detachably to base end 72a of second main shaft 72 at a position overlapping a portion of sprocket 76 axially sideways (on the left side) of drive shaft 73.

Between this second clutch 75 and sprocket 76 at a distance therefrom in the axial direction is placed a bottom surface (partition member) of bell housing 930 that is part of the crank case accommodating second clutch and separates second clutch 75 and sprocket 76.

That is to say, by the bottom surface of bell housing 930, the clutch case accommodating second clutch 75, defined by clutch cover 770b and bell housing 930, and an area of an externally exposed driving force output portion comprising sprocket 76 and chain 13 wound around sprocket 76 and guided rearward, are separated.

Figure 14:
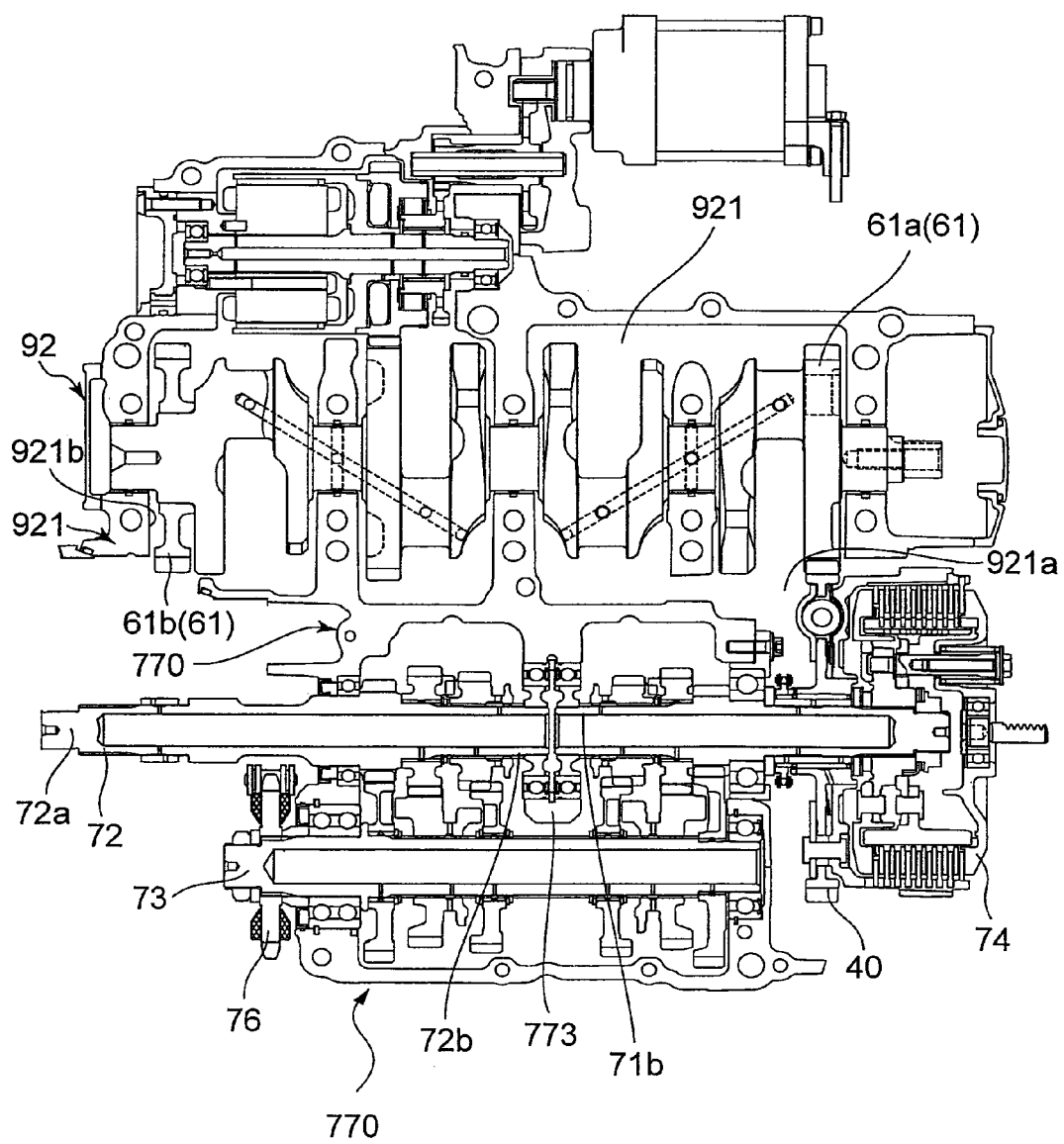
FIG. 14 is a planar cross-sectional view showing a state in which both clutch covers and a bell housing have been removed from an engine unit according to a preferred embodiment of the present invention.

FIG. 14 is a planar cross-sectional drawing showing a state in which both clutch covers, and the second clutch and a bell housing have been removed from an engine unit according to a preferred embodiment of the present invention.

On one side (the right side) of the engine unit shown in FIG. 14, clutch cover 770a has been removed from mission case 770 in engine unit case 920.

According to a engine unit having such transmission 7, first clutch 74 can be exposed on one side (the right side) of a vehicle while mounted on the vehicle simply by removing clutch cover 770a, enabling maintenance of first clutch 74 to be easily performed.

Also, on the other side of the drive unit, other clutch cover 770b has been removed from crank case 92 equipped with bell housing 930 axially sideways (leftward), and furthermore, second clutch 75 and bell housing 930 have been removed from crank case 92 (specifically, mission case 770 rearward of crank case 92) on the axial side (the left side).

Figure 15:
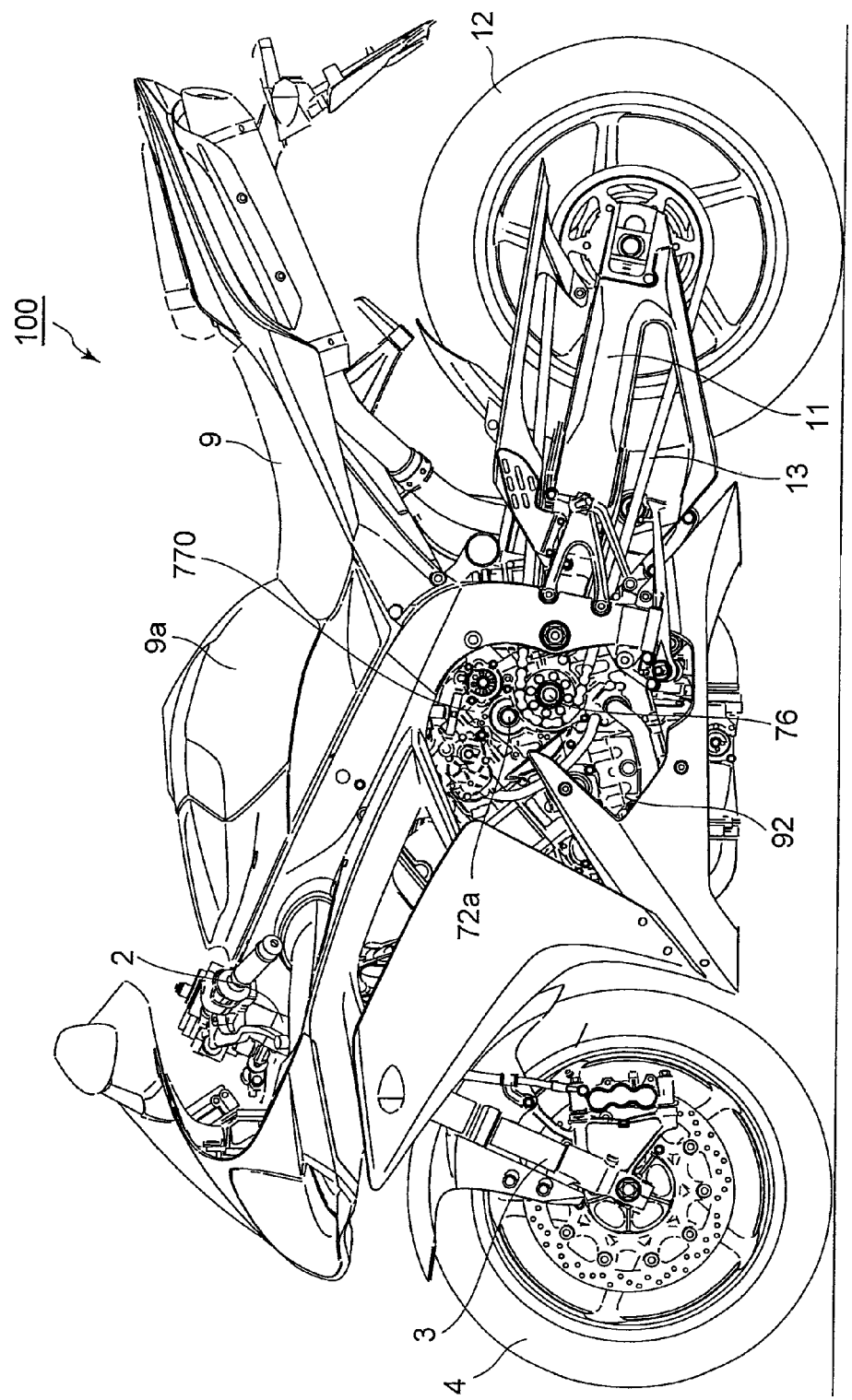
FIG. 15 is a side view showing a state in which a clutch cover covering the second clutch and a bell housing have been removed from the vehicle.

FIG. 15 is a side view showing a state in which a clutch cover covering the second clutch, and the second clutch and bell housing, have been removed from a vehicle equipped with an engine unit according to a preferred embodiment of the present invention.

An engine unit equipped with transmission 7 from which clutch cover 770b, second clutch 75, and bell housing 930 have been removed in this way, thus enables sprocket 76 and chain 13 wound around sprocket 76 to be exposed on the other side (here, the left side) while mounted on a vehicle.

Therefore, after an engine unit in which first main shaft 71, second main shaft 72, drive shaft 73, gears 81 through 86, 711, 712, 721, 722, 731, and 732, and so forth that perform power transfer between shafts 71 through 73 are provided, has been mounted on a vehicle together with engine 6 and crankshaft 60, sprocket 76 and chain 13 wound around sprocket 76 can be assembled on one side (the left side) of the vehicle.

Also, as shown in FIG. 54, with a vehicle having transmission 7, as well as removing clutch cover 770b, second clutch 75 can be removed from base end 72a of second main shaft 72, and, furthermore, crank case 92 can be removed from bell housing 930, enabling sprocket 76 to be exposed on the other side (the left side) of the vehicle.

As a result of this structure and arrangement, sprocket 76 maintenance, that is, maintenance of the portion providing drive output to rear wheel 12, including drive chain 13, and so forth, can be performed easily while an engine unit equipped with transmission is mounted on the vehicle. Thus, with a vehicle equipped with transmission 7, maintenance of drive chain 13 and sprocket 76 can be performed while the engine is mounted on the vehicle.

Figure 16:
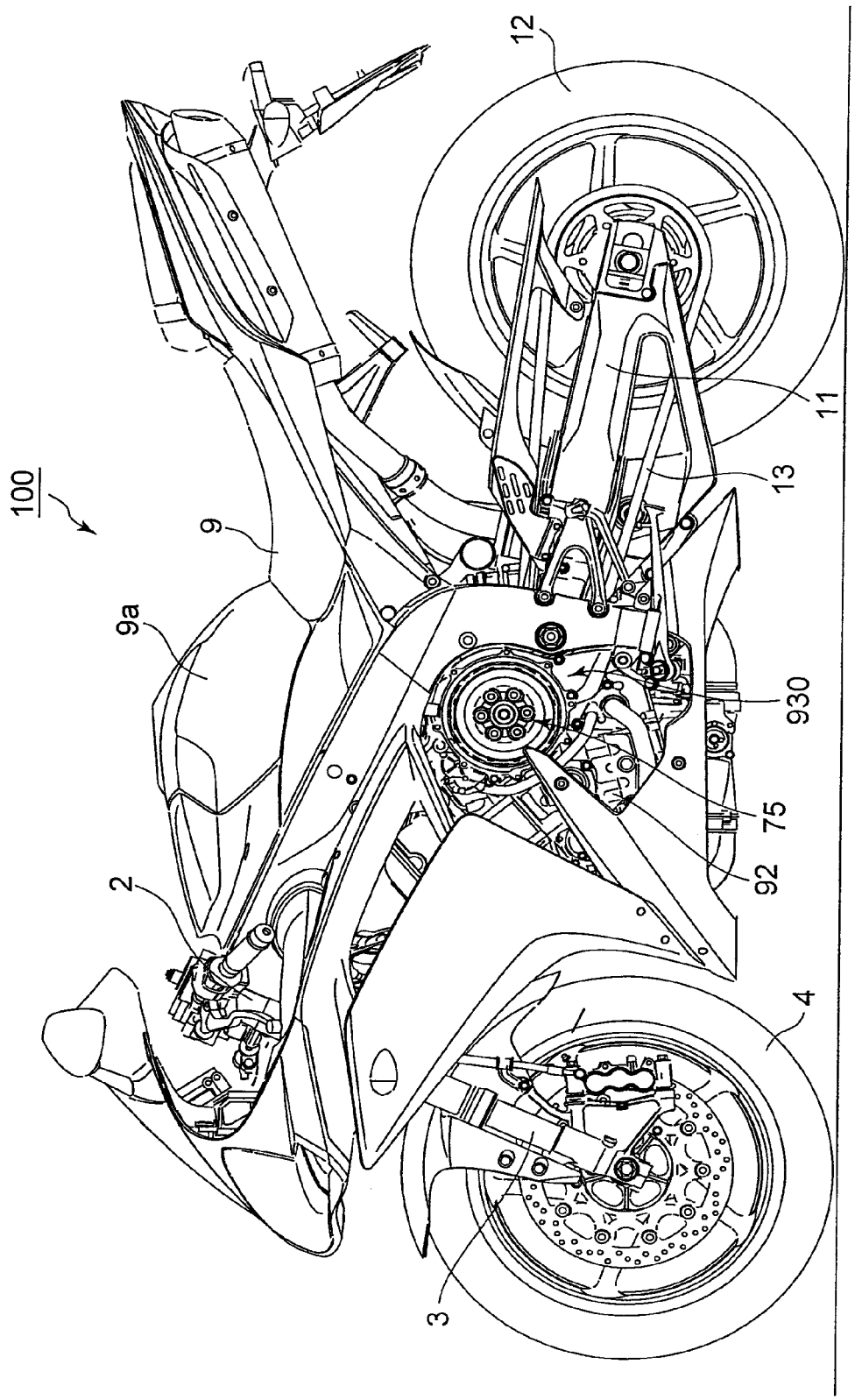
FIG. 16 is a vehicle side view showing a state in which a clutch cover covering the second clutch has been removed from a vehicle equipped with an engine unit according to a preferred embodiment of the present invention.

FIG. 16 is a vehicle side view showing a state in which a clutch cover covering the second clutch has been removed from a vehicle equipped with an engine unit according to a preferred embodiment of the present invention.

As shown in FIG. 16, second clutch 75 can be exposed on one side of the vehicle simply by removing clutch cover 770b covering second clutch 75 on the axially outward other side (the left side). As a result of this structure and arrangement, second clutch 75 maintenance can be performed easily without removing the engine unit from the frame by removing clutch cover 770b, which is part of the crank case accommodating second clutch 75, even after the engine unit has been mounted on the vehicle.

The first and second clutches 74 and 75 extend in a direction (the vehicle width direction) perpendicular or substantially perpendicular to the vehicle front-back direction via primary driven gears 40 and 50, take power from both ends of crankshaft 60 placed approximately horizontally, and transfer that power to first and second main shafts 71 and 72 respectively.

Also, these first and second clutches 74 and 75 are each equipped with a back torque limiter that limits the application of torque in a direction opposite to that of torque that is transferred to first and second main shafts 71 and 72 by crankshaft 60 and causes the vehicle to move forward. A detailed description of the configuration of first clutch 74 and second clutch 75 equipped with back torque limiters will be given below.

In this preferred embodiment, a configuration has been assumed in which first main shaft 71 and second main shaft 72 are placed at a distance from each other on the same axis line, but any kind of configuration may be used as long as transfer paths of torque of crankshaft input via first clutch 74 and second clutch 75 respectively and output to drive shaft 73 are separate systems that do not overlap on the same axis line. In other words, first and second main shafts 71 and 72 may be provided in any way as long as the configuration is such that torque of crankshaft 60 is input from a plurality of input channels, and portions that transfer power output via drive shaft 73 do not overlap coaxially. For example, a configuration may be used in which mutually facing front ends of first main shaft 71 and second main shaft 72 positioned on the same axis line overlap in a rotatable fashion.

Here, multi-plate clutches with the same kind of configuration are used as first and second clutches 74 and 75 shown in FIG. 2 through FIG. 4.

As shown in FIG. 4, first clutch 74 has first primary driven gear (first input gear) 40, clutch housing 740, plurality of clutch plates 741, plurality of friction plates 744, pressure plate 742 and clutch spring 743, and center hub 745, while second clutch 75 has second primary driven gear (second input gear) 50, clutch housing 750, plurality of clutch plates 751, plurality of friction plates 754, pressure plate 752 and clutch spring 753, and center hub 755.

In first clutch 74, as shown in FIG. 4, first pressure plate 7421 of pressure plate 742 is biased toward first input gear 40 by clutch spring 743. As a result, a state normally exists in which plurality of clutch plates 741 and plurality of friction plates 744 are in mutual contact, and the torque of crankshaft 60 (see FIG. 2) is transferred to first main shaft 71 via first input gear 40, clutch housing 740, and center hub 745.

In second clutch 75, first pressure plate 7521 of pressure plate 752 is biased toward second input gear 50 by clutch spring 753. As a result, a state normally exists in which plurality of clutch plates 751 and plurality of friction plates 754 are in mutual contact, and the torque of crankshaft 60 (see FIG. 2) is transferred to second main shaft 72 via second input gear 50, clutch housing 750, and center hub 755.

Also, as shown in FIG. 2, first clutch actuator 77 is coupled to first clutch 74 via first pullrod 70, and second clutch actuator 78 is coupled to second clutch via second pullrod 80.

First pullrod 70 is coupled to pressure plate 742 of first clutch 74 (see FIG. 3 and FIG. 4), and second pullrod 80 is coupled to pressure plate 752 of second clutch 75 (see FIG. 3 and FIG. 4).

First clutch actuator 77 shown in FIG. 2 has, for example, a link (not shown) that pulls first pullrod 70 toward the first clutch actuator 77 side, a hydraulic cylinder (not shown) that operates the link, a motor (not shown) for generating hydraulic pressure in the hydraulic cylinder, and so forth. Second clutch actuator 78 has the same kind of configuration as first clutch actuator 77.

In this preferred embodiment, first pressure plate 7421 in pressure plate 742 (see FIG. 3 and FIG. 4) is pulled toward first clutch actuator 77 due to the fact that first pullrod 70 is pulled toward first clutch actuator 77 by first clutch actuator 77. As a result, plurality of clutch plates 741 and plurality of friction plates 744 (see FIG. 4) are separated from each other, and the transfer of torque from first input gear 40 to first main shaft 71 is disconnected.

Also, first pressure plate 7521 of pressure plate 752 (see FIG. 3 and FIG. 4) is pulled toward second clutch actuator 78 due to the fact that second pullrod 80 is pulled toward second clutch actuator 78 by second clutch actuator 78. As a result, plurality of clutch plates 751 and plurality of friction plates 75 (see FIG. 4) are separated from each other, and the transfer of torque from second input gear 50 to second main shaft 72 is disconnected.

Thus, first and second clutches 74 and 75 are normally connected, and are disconnected when first and second clutch actuators 77 and 78 are driven.

These first and second clutches 74 and 75 each have a back torque limiter that limits the application of torque in first and second main shafts 71 and 72 in a direction opposite to the forward direction (the direction in which the engine drives so as to accelerate the vehicle) that is the direction in which rotation is performed in accordance with the rotation of crankshaft by engine drive. Specifically, first clutch 74 is equipped with a back torque limiter that limits back torque applied to first main shaft 71, and second clutch 75 is equipped with a back torque limiter that limits back torque applied to second main shaft 72.

The configuration of clutches (first clutch 74 and second clutch 75) equipped with a back torque limiter will now be described in detail.

First clutch 74 and second clutch 75 have the same basic configuration but with mirror-symmetric structures. Thus, second clutch 75 is also equipped with a back torque limiter having the same basic configuration as that of first clutch 74, but with a mirror-symmetric structure. Therefore, only the configuration of first clutch 74 is described below, and a description of the configuration of second clutch 75 is omitted.

Figure 5:
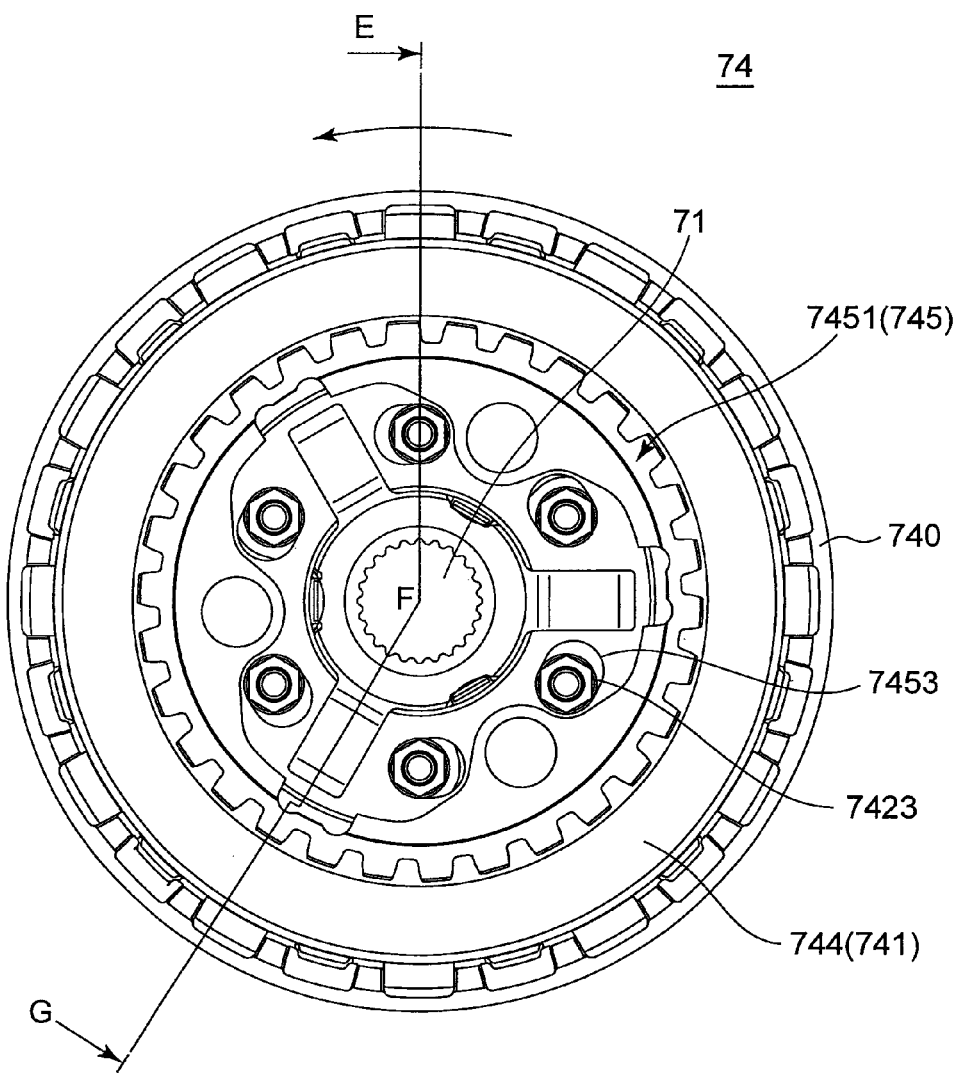
FIG. 5 is a drawing of the first clutch in the transmission shown in FIG. 3, viewed from the right side.
Figure 6:
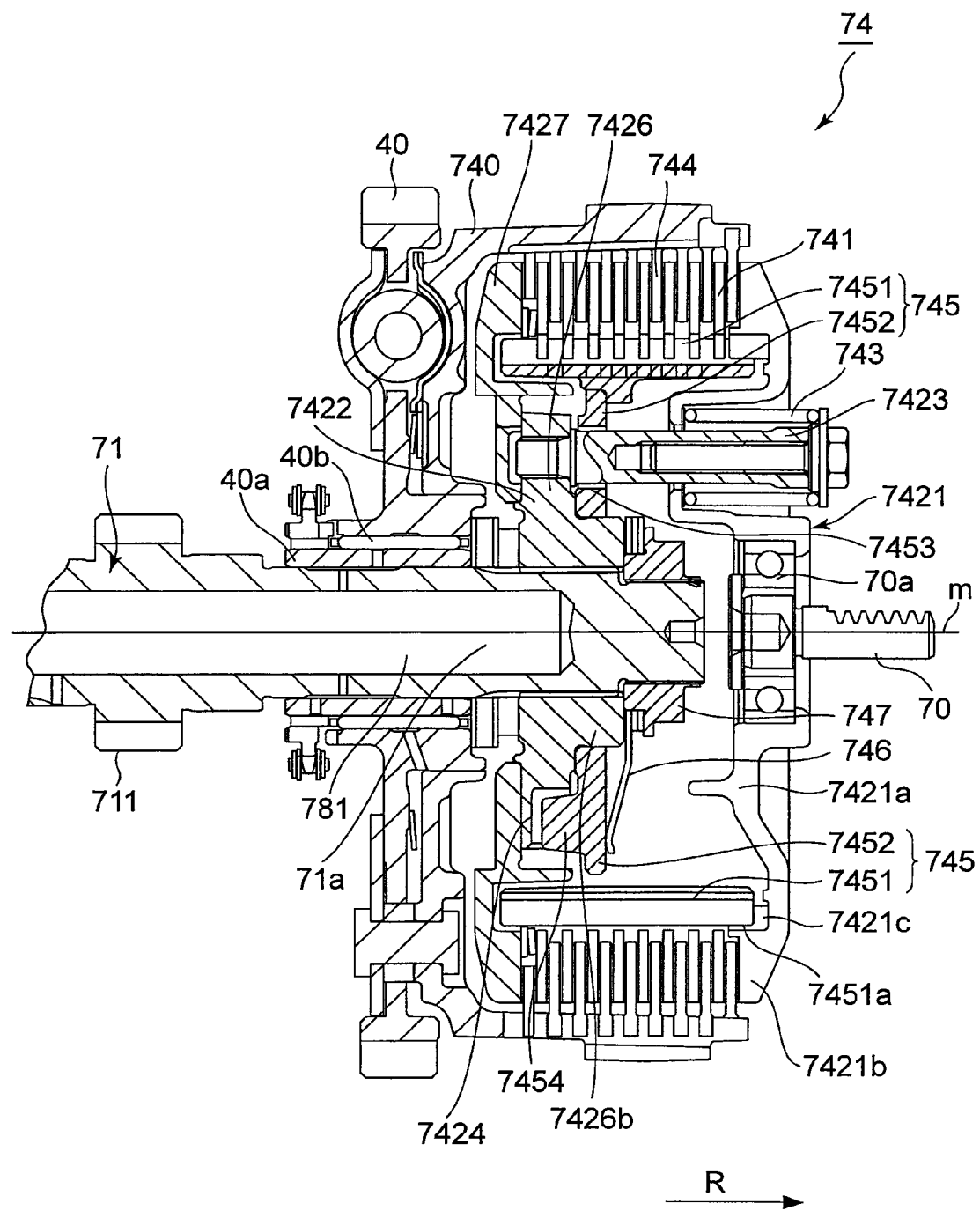
FIG. 6 is an E-F-G-line principal-portion partial cross-sectional view of the first clutch in the transmission shown in FIG. 5.
Figure 7:
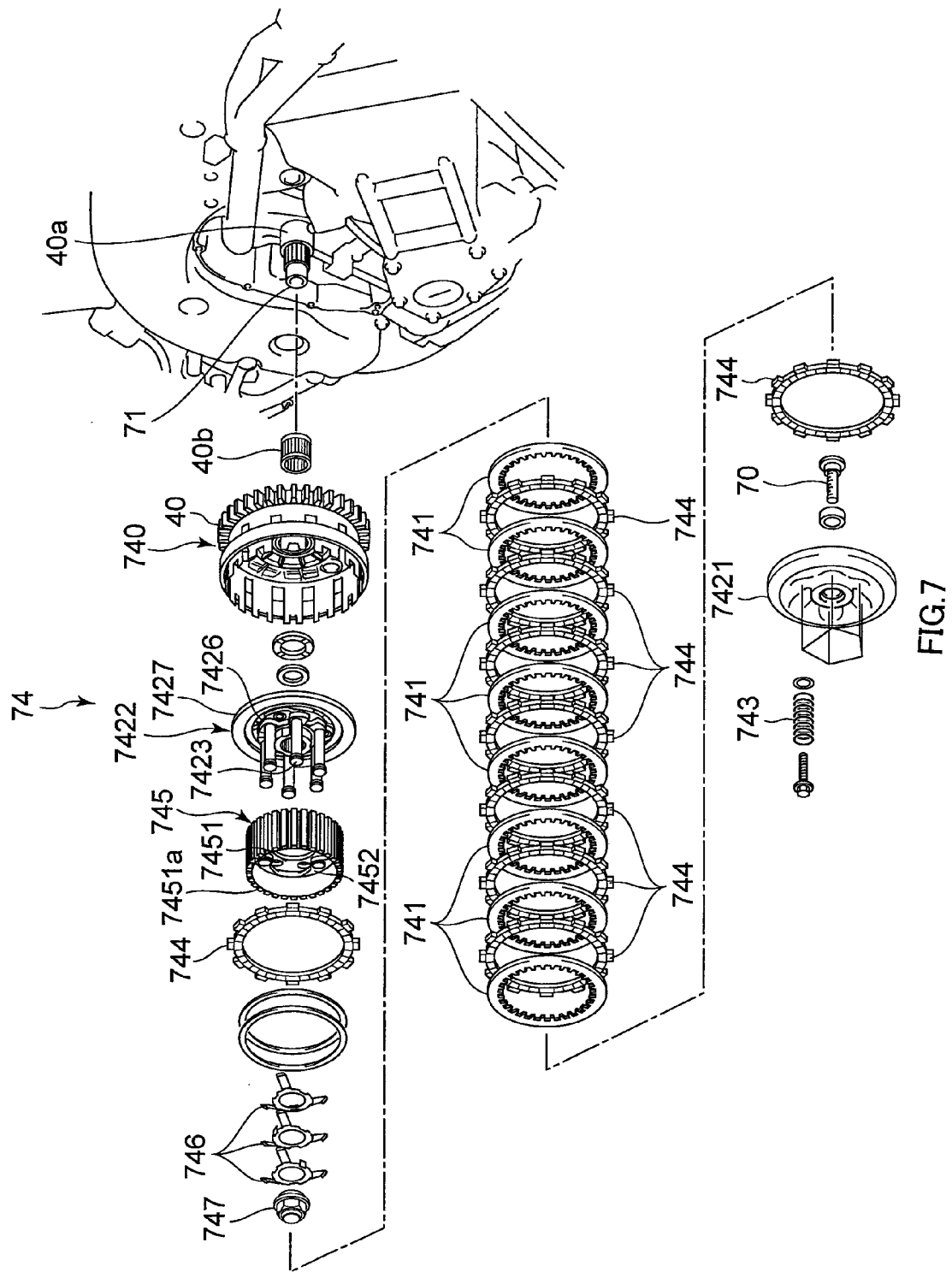
FIG. 7 is an exploded perspective view showing the principal-portion configuration of the first clutch in the transmission shown in FIG. 6.

FIG. 5 is a drawing showing a state in which clutch spring 743 and pressure plate 742 have been removed from first clutch 74 in transmission 7 shown in FIG. 3, viewed from the right side, and FIG. 6 is a partial cross-sectional view through line E-F-G of the first clutch shown in FIG. 5. FIG. 7 is an exploded perspective view showing the principal-portion configuration of the first clutch shown in FIG. 6. In the case of first clutch shown in FIG. 74, a principal-portion cross-section is shown of different parts above and below rotation center m.

As shown in FIG. 6 and FIG. 7, first input gear 40 that transfers torque of crankshaft 60 to first clutch 74 is fitted over externally fitted collar 40a and needle bearing 40b fitted around collar 40a, on other end (base end) 71a of first main shaft 71. As a result of this structure and arrangement, first input gear 40 becomes rotatable on first main shaft 71.

On this first input gear 40, clutch housing 740 is provided integrally so as to be rotatable together with input gear 40.

Clutch housing 740 has a bottomed cylindrical shape, and is attached integrally to a hub portion of input gear 40 fitted externally in a rotatable fashion on an end (base end 71a) of first main shaft 71, with first main shaft 71 inserted through the center of that bottom portion and the inside opened at one end. Thus, clutch housing 740 is rotatably attached coaxially with first main shaft 71 together with first input gear 40 to the outer periphery of an end (base end 71a) of first main shaft 71 together with first input gear 40.

Furthermore, on the inside of clutch housing 740 are provided annular friction plate 744 and annular clutch plate 741, placed alternately and mutually separably in the axial direction, center hub 745 placed inside friction plates 744 and clutch plates 741, and second pressure plate 7422 sandwiching friction plates 744 and clutch plates 741 together with first pressure plate 7421.

Center hub 745 and second pressure plate 7422 form a clutch hub section placed inside clutch housing 740.

Annular friction plates 744 are placed so as to be coaxial with first main shaft 71, and outer diameter splines arranged on the outer periphery are meshed with inner diameter splines arranged on the inner peripheral surface of clutch housing 740. As a result of this structure and arrangement, friction plates 744 become rotatable about the axial center of first main shaft 71 together with clutch housing 740.

The plurality of annular clutch plates 741 placed between these friction plates 744 are meshed with center hub 745 placed inside plurality of clutch plates 741 via the inner diameter splines arranged on the inner periphery. As a result of this structure and arrangement, clutch plates 741 rotate together with center hub 745.

As shown in FIG. 6, center hub 745 is placed, separably in the axial direction, adjacent to second pressure plate 7422 attached in a flange shape extending radially outward from first main shaft 71 projecting inside clutch housing 740. Stepped nut (muffler) 747 is attached to an end (to be specific, the base end) of this first main shaft 71 via externally fitted leaf spring 746.

This stepped nut 747 fixes second pressure plate 7422 to an end of first main shaft 71 and prevents its detachment from that first main shaft 71, and also inhibits movement of leaf spring 746 in the axial direction.

Center hub 745 is placed so as to surround an end of first main shaft 71, and is provided with a bottomed cylindrical shape by cylindrical section 7451 on which outer diameter splines are arranged that mesh with inner diameter splines of clutch plates 741 on the outer peripheral surface, and boss section 7452 of a disk shape, placed on press boss section 7426 of second pressure plate 7422. Here, cylindrical section 7451 is equipped with an attachment piece having a rivet hole (not shown) that extends inside the inner wall on one opening side, and boss section 7452 is attached to the back surface of this attachment piece.

Cylindrical section 7451 shown in FIG. 6 is connected movably in the axial direction in a state in which movement in the rotation direction is regulated by being mortised to first pressure plate 7421 at the open end edge of one end. Specifically, outer diameter splines 7451a arranged on the outer peripheral surface on the open end edge of cylindrical section 7451 mesh with inner diameter splines 7421c arranged along the axial direction of annular projection 7421b projecting toward second pressure plate 7422 from the outer periphery of body 7421a of first pressure plate 7421, so that movement in the circumferential direction is regulated, and movement in the axial direction is not restricted.

The opening at the other end of this cylindrical section 7451 is closed by boss section 7452, and this boss section 7452 is biased toward second pressure plate 7422 by leaf spring 746 from one end of first main shaft 71.

Leaf spring 746 is fixed by stepped nut 747 attached to first main shaft 71 projecting and passing through press boss section 7426 of second pressure plate 7422 inside center hub 745. Inside clutch housing 740, leaf spring 746 presses boss section 7452 (center hub 745) placed separably in the axial direction with respect to second pressure plate 7422 toward second pressure plate 7422 from the stepped nut 747 side.

Boss section 7452 has elongated hole 7453 through which stud 7423 rising from second pressure plate 7422 in the axial direction passes movably in the circumferential direction, and convex follower cam 7454 that engages with concave operating cam 7424 arranged on second pressure plate 7422 disengageably about the axis. A plurality of these elongated holes 7453 and follower cams 7454 are placed at predetermined intervals in the circumferential direction of boss section 7452.

This boss section 7452 is rotatably fitted over press boss hub section 7426b of press boss section 7426 of second pressure plate 7422 attached to an end of first main shaft 71. Also, follower cam 7454 of boss section 7452 in center hub 745 is in an engaged state placed inside operating cam 7424 of press boss section 7426. With boss section 7452 in this state, stud 7423 rising from outer periphery 7426a is inserted into an elongated hole so as to be movable by a predetermined distance in the circumferential direction.

In boss section 7452, follower cam 7454 is provided on the surface opposite press boss section 7426 of second pressure plate 7422 (For convenience, referred to as the "opposing surface"), projecting toward the press boss section 7426 side. Follower cam 7454 is arranged on boss section 7452 so as to engage in the rotation direction with the opposing surface abutting follower cam 7424 when rotating in one direction about the axis, and to rotate with the opposing surface separated from follower cam 7424 when rotating in the other direction.

Figure 8A:
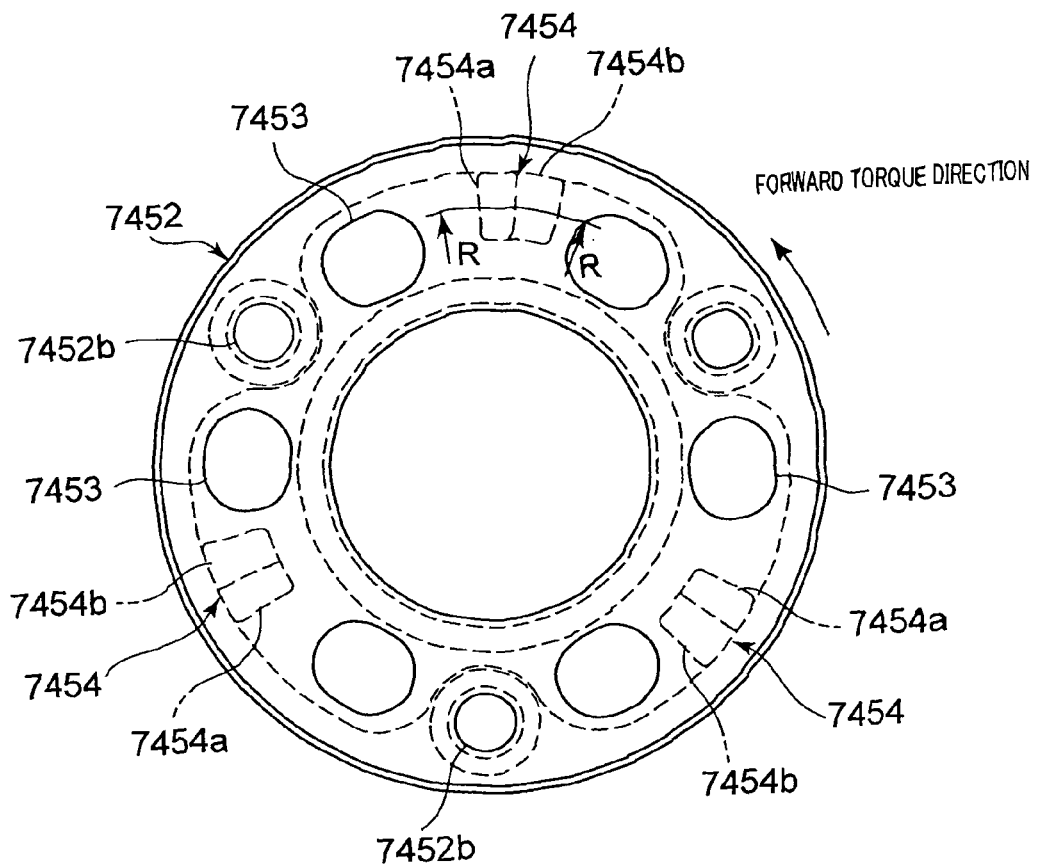
FIGS. 8A and 8B are drawings showing a boss section of a center hub equipped with a follower cam in the first clutch.
Figure 8B:
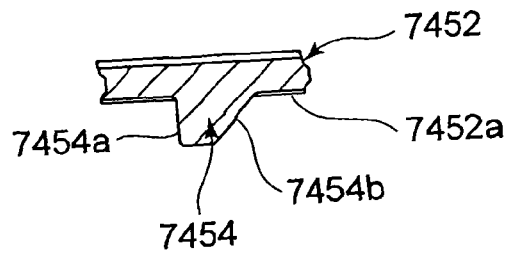

FIG. 8 is a drawing showing boss section 7452 of center hub 745 equipped with follower cam 7454 in first clutch 74, in which FIG. 8A is a drawing of the same boss section 7452 viewed from the opposing surface, that is, from one end of first main shaft 71 (the right side of the vehicle), and FIG. 8B is a partial cross-sectional view through R-R line in FIG. 8A.

As shown in FIG. 8, follower cam 7454 projects from opposing surface 7452a of boss section 7452 suspended inside cylindrical section 7451 in center hub 745. Follower cam 7454 has contact end surface 7454a on the counterclockwise direction side that makes surface contact with operating cam 7424 when output to the rear wheel, which is the driving wheel, by rotation in a counterclockwise direction when viewing the vehicle from the right side, and inclined surface 7454b that is inclined toward the clockwise direction side from the projecting end of contact end surface 7454a. Here, follower cam 7454 preferably has a right-angled trapezium longitudinal shape, with contact end surface 7454a rising perpendicular or substantially perpendicular with respect to opposing surface 7452a, and having inclined surface 7454b inclined toward the opposing surface 7452a side from the periphery of the projection of that contact end surface 7454a.

In boss section 7452 of center hub 745, elongated holes 7453, and rivet holes 7452 joined via rivets to rivet holes (not shown) of an attachment piece extending inward from the inner wall of cylindrical section 7451 (see FIG. 6), are arranged at predetermined intervals around the central opening.

As shown in FIG. 6, with respect to follower cam 7454, operating cam (helical cam) 7424 preferably has a concave shape on the opposing surface of press boss section 7426 facing boss section 7452 of center hub 745 on second pressure plate 7422.

Press boss section 7426 is disk-shaped, and defines second pressure plate 7422 by annular flange 7427 attached around the periphery, and a plurality of studs 7423 attached so as to rise from the top of the opposing surface (see FIG. 6 and FIG. 7).

Figure 9A:
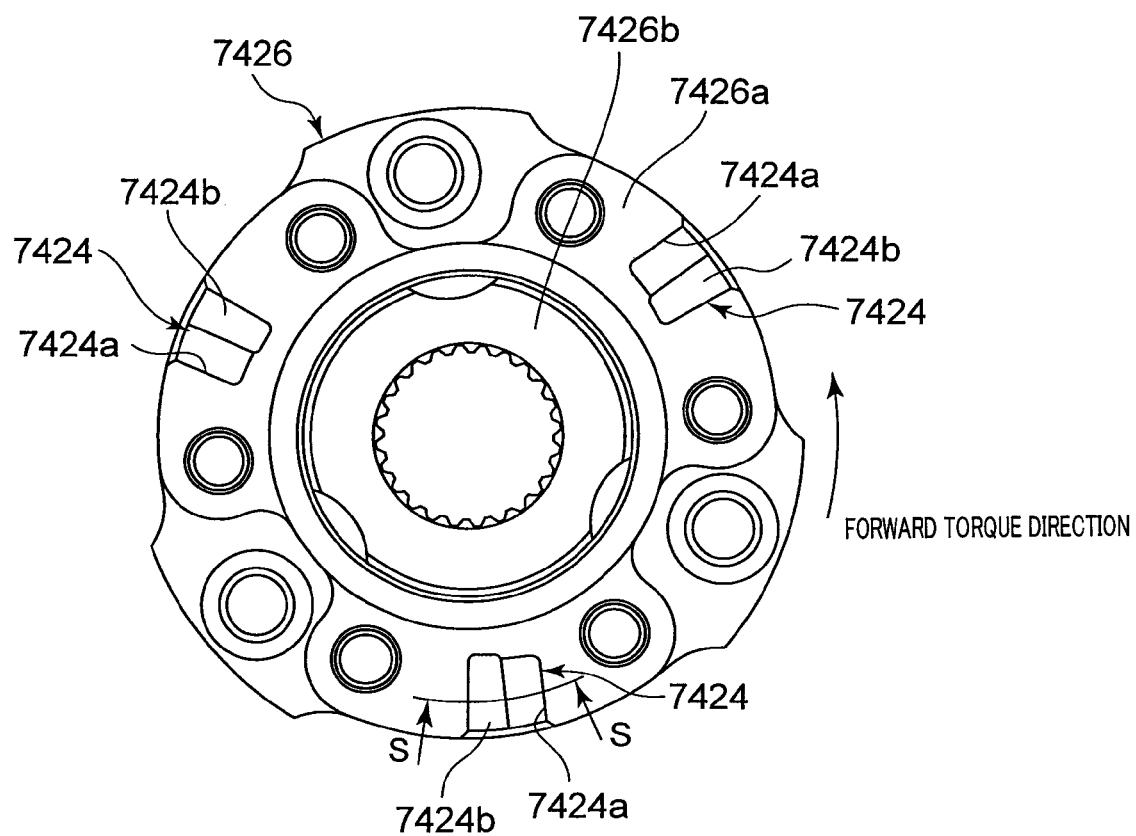
FIGS. 9A and 9B are drawings showing a press boss section of a second pressure plate in the first clutch.
Figure 9B:
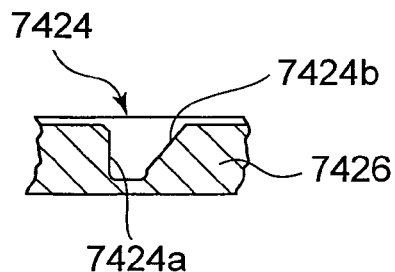

FIG. 9 is a drawing showing press boss section 7426 of second pressure plate 7422 in first clutch 74, in which FIG. 9A is a front view of press boss section 7426 from the opposing surface side, that is, one end of first main shaft 71 (the right side of the vehicle), and FIG. 9B is a partial cross-sectional view through line S-S in FIG. 9A.

Press boss section 7426 shown in FIG. 9 is disk-shaped, and is joined by a spline coupling to base end 71a of first main shaft 71 inserted into an opening provided in the center, and rotates integrally and coaxially with first main shaft 71.

Press boss section 7426 has press boss hub section 7426b projecting toward the boss section 7452 side in the center portion around the opening in which first main shaft 71 is inserted in disk-shaped outer periphery 7426a having an opposing surface facing boss section 7452 of center hub 745.

Boss section 7452 of center hub 745 is fitted over this press boss hub section 7426b so as to be movable in the axial direction and in the circumferential direction, and is placed overlapping press boss section 7426 in the axial direction. At this time, convex follower cam 7454 provided on boss section 7452 of center hub 745 fits disengageably inside concave operating cam 7424 provided on the opposing surface of outer periphery 7426a on press boss section 7426.

Operating cam 7424 corresponds to the shape of follower cam 7454 from the opposing surface, and preferably has a concave shape having vertical end surface 7424a parallel or substantially parallel to the axial direction and perpendicular or substantially perpendicular to the opposing surface, and inclined surface 7424b that is inclined in the circumferential direction.

Operating cam 7424 on second pressure plate 7422 and follower cam 7454 on center hub 745 are arranged so as to engage by rotating in one direction around the axis about the axial center of first main shaft 71, and to disengage through rotation in the other direction around the axis.

Specifically, operating cam 7424 and follower cam 7454 have inclined surfaces 7424b and 7425b that slide against each other formed as surfaces inclined helically about the axial center.

Here, "the other direction around the axis" means the opposite direction to the forward torque direction in which torque is transferred from crankshaft 60 via first clutch 74 and drives the rear wheel. Therefore, "the other direction around the axis" in first clutch 74 here is a clockwise direction, opposite to the counterclockwise direction in which forward torque is transferred to drive shaft 73 as viewed from the right side of the vehicle through rotation of first main shaft 71.

Also, as viewed from the left side of the vehicle, "the other direction around the axis" in second clutch is a counterclockwise direction, opposite to the clockwise direction in which forward torque is transferred to drive shaft 73 through rotation of second main shaft 72.

Figure 10:
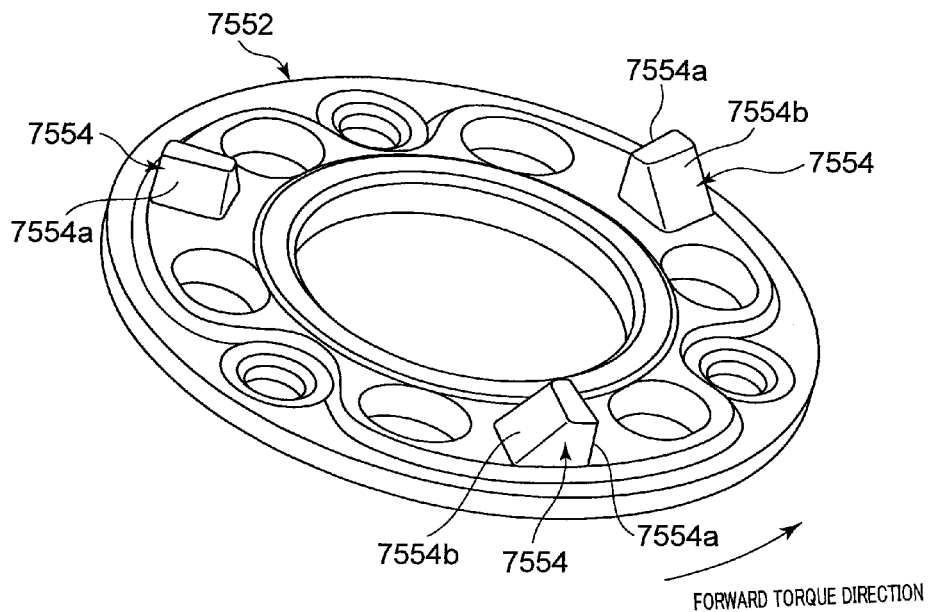
FIG. 10 is a perspective view showing a boss section of a center hub in the second clutch, viewed from the opposite surface side.
Figure 11:
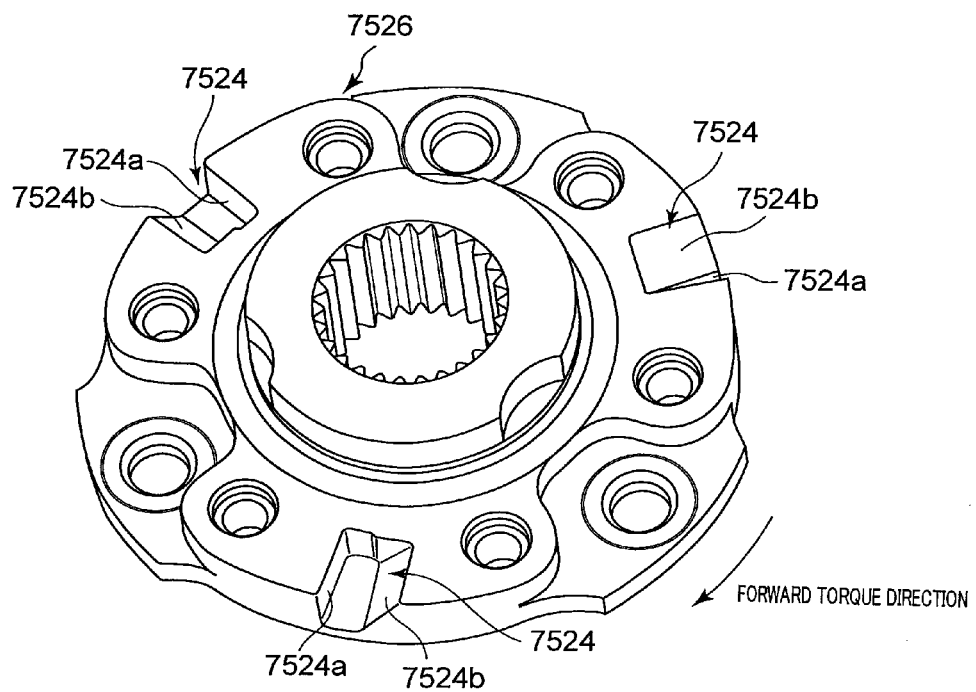
FIG. 11 is a drawing of a press boss section of a second pressure plate located opposite a boss section of a center hub in the second clutch, viewed from the opposite surface side.

Consequently, with second clutch 75 that has a mirror-symmetric structure with respect to first clutch 74, boss section 7552 of center hub 755 shown in FIG. 10 and press boss section 7526 of the second pressure plate shown in FIG. 11 fit rotatably about the base end 72a side of second main shaft 72.

That is to say, with second clutch 75, convex follower cam 7554 and concave operating cam 7524 are arranged on opposing surfaces of boss section 7552 shown in FIG. 10 and press boss section 7526 shown in FIG. 11, so that, rotating relatively about the axial center of second main shaft 72, the respective opposing surfaces engage with each other in one direction around the axis (the clockwise direction), and disengage from each other in the other direction around the axis (the counterclockwise direction), as viewed from the left side of the vehicle.

Specifically, operating cam 7524 and follower cam 7554 have contact end surfaces 7524a and 7554a that are placed on a flat surface passing through the axial center at the clockwise-side end as viewed from the left side of the vehicle, and make surface contact and engage with each other when rotating relatively. Also, operating cam 7524 and follower cam 7554 have inclined surfaces 7524b and 7554b that are inclined helically about the axial center, and through the sliding against each other of these inclined surfaces 7524b and 7554, boss section 7552 is distanced from press boss section 7526 in the axial direction.

By the operation of these operating cams and follower cams rotating relatively and coaxially, the clutches restrict back torque.

FIG. 12 is a schematic diagram showing the relationship between an operating cam of a press boss section and a follower cam of a boss section as viewed from the axial center side. Here, a description will be given using an operating cam of a press boss section and a follower cam of a boss section in the first clutch.

Figure 12A:
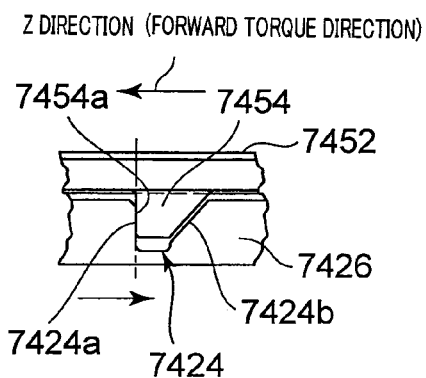
FIGS. 12A, 12B, and 12C are schematic diagrams showing the relationship between an operating cam of a press boss section and a follower cam of a boss section.

When torque is transferred from crankshaft 60 via first input gear 40 while operating cam 7424 and follower cam 7454 are engaged, in clutch 74 boss section 7452 of center hub 745 rotates in one direction that is the Z direction in which torque is applied (the counterclockwise direction of the main shaft as viewed from the right side of the vehicle). At this time, as shown in FIG. 12A, press boss section 7426 is pressed in the Z direction via follower cam 7454 and operating cam 7424, moves in that direction, and rotates first main shaft 71 in the Z direction.

Figure 12B:
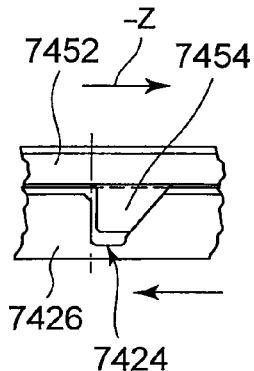

Also, with this configuration, if a larger force than the torque rotating in the Z direction transferred from boss section 7452 of center hub 745 is applied to press boss section 7426 so that rotation is performed in the other direction around the axis, boss section 7452 slides over the inclined surface of operating cam 7424 as shown in FIG. 12B. As a result, boss section 7452 moves in a −Z direction with respect to operating cam 7424.

Figure 12C:
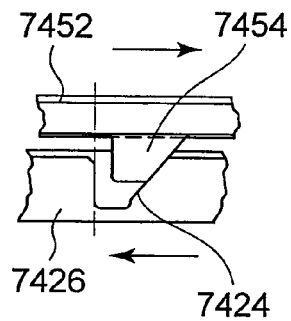

Then follower cam 7454 of boss section 7452 is distanced from operating cam 7424 of press boss section 7426, as shown in FIG. 12C, by sliding farther over the inclined surface of operating cam 7424. As a result of this structure and arrangement, center hub 745 itself moves axially in a direction that distances it from second pressure plate 7422 (toward the base end of first main shaft 71).

Power is taken from the base end of crankshaft 61 via first clutch 74 and second clutch 75 configured in this way, is transferred selectively to first main shaft 71 and second main shaft 72, and is output to rear wheel 12 (see FIG. 1) from drive shaft 73.

Next, the operation of back torque limiters in clutches 71 and 72 having operating cams 7424 and follower cams 7454 will be described.

Figure 13:
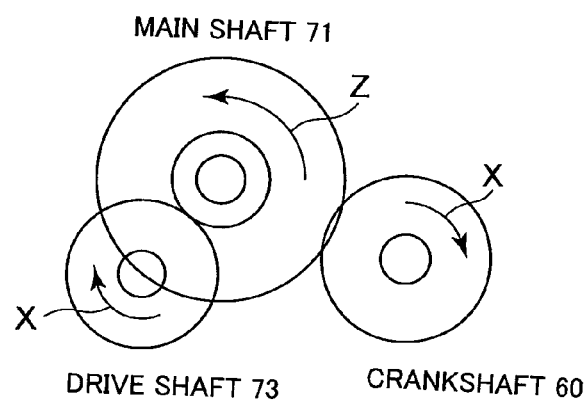
FIG. 13 is a schematic diagram showing an axis arrangement of a crankshaft, main shaft, and drive shaft in a transmission according to a preferred embodiment of the present invention, viewed from the right side of the vehicle.

This description is based on a view from the right side of the vehicle, so that, when forward torque is applied and normal drive is performed in the engine unit having clutches 74 and 75, crankshaft 60 rotates clockwise ("CW") and main shafts (first main shaft 71, 72) rotate counterclockwise ("CCW") as indicated by the arrow Z direction and drive shaft 73 rotates clockwise (CW) as indicated by the arrow X as shown in FIG. 13.

In the engine unit, of the torque generated by the engine and transferred to clutches 74 and 75, torque that transfers power to drive shaft 73 and that is applied in a direction in which rear wheel 12 rotates in the running direction, is designated "forward torque" for clutch 74 for first main shaft 71, and torque applied in the opposite direction to this forward torque is designated "reverse torque."

When forward torque is applied, it is assumed, for example, that crankshaft 60 rotates clockwise (in the X direction), the main shaft rotates in the Z direction, and drive shaft 73 rotates in the X direction.

That is to say, power from crankshaft 60 rotating in CW direction X through engine drive is input to clutch housing 740 via first input gear 40, and clutch housing 740 rotates in CCW direction Z about the axial center of first main shaft 71.

When clutch housing 740 rotates in the Z direction, friction plates 744 meshed with inner diameter splines of clutch housing 740 also rotate integrally. Between friction plates 744 are sandwiched a plurality of clutch plates 741 meshed with the outer diameter of center hub 745 by inner diameter splines.

When clutch connection is performed, first pressure plate 7421 is pressed toward second pressure plate 7422 by the force clutch spring 743 tries extend. Consequently, through this pressure, friction plates 744 and clutch plates 741 are pressed toward second pressure plate 7422, pressure operates mutually between friction plates 744 and clutch plates 741, and frictional force is generated.

Through this configuration, when friction plates 744 rotate, center hub 745 rotates via clutch plates 741.

Also, torque from crankshaft 60 is transferred to center hub 745, with torque (that is, a clutch transfer torque capacity) of a magnitude obtained by multiplication of frictional force generated between friction plates 744 and clutch plates 741 and the effective contact perimeter between friction plates 744 and clutch plates 741 (that is, the distance from the approximate center of the contact width to the center of first main shaft 71), as an upper limit.

Cam concavities and convexities are combined on second pressure plate 7422, and center hub 745 is fitted thereto so as to be movable in the axial direction by engagement and disengagement thereof. To be specific, back torque limiter cams (here, concave operating cam 7424 and convex follower cam 7454) provided on the respective opposing surfaces of boss section 7452 of center hub 745 and press boss section 7426 on second pressure plate 7422 each have one surface arranged as a surface approximately parallel or substantially parallel to the center axis of first main shaft 71, and the other surface arranged as an approximately helical surface.

In concave operating cam 7424 and convex follower cam 7454, these "one surfaces" are provided on the drive direction Z end of first main shaft 71, and the "other surfaces" are provided so as to incline toward the reverse Z direction side from the "one surface" side.

Consequently, during engine drive, when clutch housing 740, friction plates 744, clutch plates 741, and center hub 745 are transferring torque in the direction (Z direction) for driving second pressure plate 7422 and first main shaft 71, torque is transferred from center hub 745 to press boss section 7426 of second pressure plate 7422 via a surface approximately parallel or substantially parallel to the center axis of cam convexity/concavity first main shaft 71.

Press boss section 7426 of second pressure plate 7422 meshes with outer diameter splines of first main shaft 71 via inner diameter splines arranged on an inner peripheral surface forming an opening. Consequently, torque acting on press boss section 7426 of second pressure plate 7422 is transferred to first main shaft 71, the torque is transferred to drive shaft 73 via one of the gears on first main shaft 71 (Fixed gear 711, fifth gear 85, and spline gear 712 on first main shaft 71), and driving force is output.

Thus, first clutch 74 has clutch housing 740 coupled to crankshaft 60 in a rotatable fashion via first input gear 40, a clutch hub section (second pressure plate 7422 and center hub 745) coupled rotatably and coaxially to first main shaft 71 and placed inside clutch housing 740, friction plates 744 and clutch plates 741 alternately interposed between clutch housing 740 and the clutch hub section, first pressure plate (pressure plate section) 7421 that presses friction plate 744 in the axial direction and connects friction plates 744 and clutch plates 741, and clutch spring (biasing member) 743 that presses first pressure plate 7421 toward the friction plate 744 side. Also, the clutch hub section is equipped with press boss section (clutch boss section) 7426 of second pressure plate 7422 directly coupled to first main shaft 71, and center hub 745 that supports clutch plates 741 and is also movable in the axial direction, and relatively rotatable, with respect to press boss section 7426.

A back torque limiter is equipped with operating cam (concave section) 7424 defining a concavity in the axial direction in one of mutually opposing surfaces in press boss section 7426 and center hub 745, follower cam (convex section) 7454 projects in the axial direction on the other surface, and leaf spring (limiting biasing member) 746.

With regard to operating cam (concave section) 7424, a surface on the opposite side in the circumferential direction to the direction in which forward torque that drives rear wheel 12 is applied, is a helical cam surface centered about the rotation center. Follower cam (convex section) 7454 preferably corresponds to the shape of concave operating cam (concave section) 7424, and, when press boss section 7426 rotates relatively in the direction of the rotation of center hub 745 with respect to center hub 745, follower cam (convex section) 7454 disengages the clutch by moving center hub 745 toward the first pressure plate 7421 side. Also, leaf spring 746 presses center hub 745 toward press boss section 7426, and when reverse torque acting on press boss section 7426 is less than or equal to a predetermined level, follower cam (convex section) 7454 is engaged mutually with operating cam 7424 (concave section) and relative rotation with respect to center hub 745 is disabled, and when reverse torque exceeds predetermined torque, follower cam (convex section) 7454 is made to slide across the cam surface of operating cam 7424 (concave section), and press boss section 7426 and center hub 745 are relatively rotated.

Here, reverse torque means such torque that makes torque input from engine 6 (see FIG. 1) to clutch housing 740, friction plates 744, clutch plates 741, and center hub 745 via first input gear 40 be in a deceleration direction (the opposite direction to that indicated by arrow Z).

Reverse torque is generated when, in the configuration of the engine unit that takes power from both ends of crankshaft 60 placed horizontally to left and right, left and right clutches 74 and 75 are both connected while power transfer gears on both the left and right are meshed enabling transfer of power in a shift change or the like, and torque is applied to both clutches. Normally, with transmission mechanism 700 of the engine unit, control is performed by ECU 10 so that a shift change is performed instantaneously by switching from one clutch to the other, and therefore there are no effects due to reverse torque. However, if control by ECU 10 is not performed for some reason at the time of a shift change, torque in the reverse of the rotation direction may be applied to one clutch taking power from one of the two ends of crankshaft 60, via crankshaft 60 and drive shaft 73, from the power transfer having the other clutch (for example, second clutch 75 for first clutch 74).

Here, a case will be described in which reverse torque is applied in the power transfer having one clutch (here, first clutch 74).

FIG. 13 is a drawing provided to explain a back torque limiting operation in a transmission according to a preferred embodiment of the present invention, being a schematic diagram showing an axis arrangement of a crankshaft, main shaft, and drive shaft in a transmission mounted in a vehicle, viewed from the right side of the vehicle. When the vehicle is moving forward (running in the normal forward direction) crankshaft 60, first main shaft 71, and drive shaft 73 in FIG. 13 rotate in the X direction, in the Z direction, and in the X direction, respectively. Also, as stated above, when the vehicle is moving forward, that is, when the vehicle is running in the normal forward direction, reverse torque acts on first clutch 74.

With first clutch 74 in this state (see FIG. 6), reverse torque is transferred to center hub 745 from press boss section 7426 of second pressure plate 7422 via an approximately helical surface centered on the center axis of first main shaft 71 that is the other surface that slides in operating cam 7424 and follower cam 7454. That is to say, when reverse torque is transferred in the order drive shaft 73→first main shaft 71→second pressure plate 7422, follower cam 7454 of center hub 745 moves so as to swell in a helical shape along operating cam 7424 of second pressure plate 7422 due to reverse torque. When follower cam 7454 moves along operating cam 7424 in this way, press boss section 7426 of second pressure plate 7422 and center hub 745 move so as to become distanced from each other on the axis line of first main shaft 71 (see FIG. 12).

That is to say, boss section 7452 of center hub 745 having follower cam 7454 rotates about first main shaft 71 and moves toward first pressure plate 7421 in the axial direction of first main shaft 71.

Boss section 7452 of center hub 745 is biased in a direction in which a projection (convexity) of follower cam 7454 is accommodated by a depression (concavity) of operating cam (helical cam) 7424 by leaf spring 746 via nut 747.

Consequently, in clutch 74 prior to the operation of the back torque limiter, center hub 745 continues rotating in the R direction from operating cam (helical cam) 7424 and swells until the R direction component (see FIG. 6) of resistance arising at the other surface (helical cam surface) due to reverse torque, and the pressing force of leaf spring 746, are in balance.

Until one end surface (the opening-side end surface of the cylindrical shape) of center hub 745 that swells in this way reaches first pressure plate 7421, reverse torque is transferred successively to crankshaft 60, that is, engine 6 (see FIG. 1), from drive shaft 73 via first main shaft 71, press boss section 7426 of second pressure plate 7422, and the helical cam surfaces of operating cam 7424 and follower cam 7454, and via plurality of friction plates 754, clutch plates 741, friction plates 744, clutch housing 740, and first input gear 40.

When reverse torque further increases, the limiter in clutch 74 operates.

Specifically, when reverse torque further increases, and the end surface (the opening-side end surface of the cylindrical section) of center hub 745 reaches first pressure plate 7421, center hub 745 continues rotating and swells the helical cam surface in the R direction up to a position at which the R direction component of resistance arising at the helical cam surface due to reverse torque, and the resultant force of pressing force of clutch spring 743 added to the bias of leaf spring 746, are in balance.

As a result of this structure and arrangement, the pressing force of clutch spring 743 pressing friction plates 744 and clutch plates 741 against second pressure plate 7422 via first pressure plate 7421 is decreased. Thus, frictional force operating between friction plates 744 and clutch plates 741 is reduced, and the transfer torque capacity of the clutch decreases. At this time, clutch 74 continues reverse torque transfer within a range in which the magnitude of the reverse torque is less than the transfer torque capacity of the clutch for which the pressing force of clutch spring 743 has been reduced. On the other hand, when the magnitude of the reverse torque exceeds the transfer torque capacity of the clutch for which the pressing force of clutch spring 743 has been reduced, friction plates 744 and clutch plates 741 rotate relatively, that is, the clutch slips and reverse torque transfer is limited.

As a result of this structure and arrangement, the clutch transfer torque capacity with respect to reverse torque attains its upper limit while the clutch is slipping, and greater reverse torque than that is not transferred.

Thus, if a predetermined capacity is exceeded when reverse torque is applied to a clutch, the transfer torque capacity with respect to reverse torque can be limited by the operation of a back torque limiter whereby first pressure plate 7421 and clutch plates 741 slip with respect to friction plates 744.

In a recovery from this back torque limiter operation, when reverse torque diminishes or when a transition is made to a forward torque state as a result of operating the throttle of engine 6 (see FIG. 1), a change in the rotation speed of drive shaft 73, operating the clutch actuator (78) that operates the other clutch (for example, second clutch 75) or shift mechanism 701, or the like, center hub 745 is pressed back by leaf spring 746 in a direction opposite to the R direction along the inclined surface of the helical cam.

That is to say, center hub 745 moves toward the second pressure plate 7422, the reduced pressing force due to clutch spring 743 is restored, and the transfer torque capacity of first clutch 74 recovers. At this time, mutual boss section cam surfaces 7454b and 7424b or 7454a and 7424a engage, and a state in which torque is transferred by these engaging surfaces is restored.

Through selective connection of first and second clutches 74 and 75 to first and second main shafts 71 and respectively configured in this way, transmission mechanism 700 performs power transfer for odd-numbered gears and even-numbered gears. Gear shifting of transmission gears in transmission mechanism 700 is performed by an operation of shift mechanism 701 controlled by ECU 10 together with transmission mechanism 700.

A description will now be given of the gears that connect first main shaft 71 and second main shaft 72 that output engine power, and drive shaft 73, by selective connection of a clutch having a back torque limiter in this way.

As shown in FIG. 2 through FIG. 4, gears 711, 721, 85, 86, 712, and 722 that mesh with gears 81, 82, 731, 732, 83, and 84 of drive shaft 73 are placed on first main shaft 71 and second main shaft 72 respectively.

Specifically, the following gears are arranged on first main shaft 71 in order from the base end to which first clutch 74 is connected: fixed gear (also referred to as "first-equivalent gear") 711, fifth gear 85, and spline gear (also referred to as "third-equivalent gear") 712. Fixed gear 711 is preferably integral with first main shaft 71, and rotates together with first main shaft 71. Fixed gear 711 meshes with first gear 81 of drive shaft 73, and therefore is also referred to as "first-equivalent gear."

Fifth gear 85 is attached to first main shaft 71, so as to be rotatable about the axis of first main shaft 71 and with its movement regulated in the axial direction, at a position between and at a distance from first-gear fixed gear 711 and third-gear spline gear 712.

Fifth gear 85 meshes with spline gear 731 (also referred to as "fifth-equivalent gear") of drive shaft 73.

Spline gear 712 is attached to first main shaft at the front end of first main shaft 71—that is, at the distant end from first clutch 74—so as to be movable in the axial direction, and rotates together with the rotation of first main shaft 71.

Specifically, spline gear 712 is attached to first main shaft 71, so as to be able to slide in the axial direction while its rotation is regulated, by splines arranged along the axial direction on the outer periphery of the front end of first main shaft 71, and meshes with third gear 83 of drive shaft 73. This spline gear 712 is coupled to shift fork 142, and moves on first main shaft 71 in the axial direction through movement of shift fork 142. Spline gear 712 is also referred to here as "third-equivalent gear."

Spline gear 712 moves toward fifth gear 85 on first main shaft 71 and engages with fifth gear 85, and regulates rotation (idling) about the axis of fifth gear on first main shaft 71. Through the engagement of spline gear 712 with fifth gear 85, fifth gear 85 is fixed to first main shaft 71, and is made integrally rotatable together with the rotation of first main shaft 71.

On the other hand, the following gears are arranged on second main shaft 72 in order from the base end to which second clutch 75 is connected: fixed gear (also referred to as "second-equivalent gear") 721, sixth gear 86, and spline gear (also referred to as "fourth-equivalent gear") 722.

Fixed gear 721 is preferably integral with second main shaft 72, and rotates together with second main shaft 72. Fixed gear 721 meshes with second gear 82 of drive shaft 73, and therefore is also referred to as "second-equivalent gear." Fixed gear 721 meshes with 2-speed gear 82 of drive shaft 73, and is also referred to here as second gear.

Sixth gear 86 is attached to second main shaft 72, so as to be rotatable about the axis of second main shaft 72 and with its movement regulated in the axial direction, at a position between and at a distance from second-gear fixed gear 721 and fourth-gear spline gear 722. This sixth gear 86 meshes with spline gear 732 (also referred to as "sixth-equivalent gear") of drive shaft 73.

Spline gear (fourth-equivalent gear) 722 is attached to second main shaft 72 at the front end of second main shaft 72, that is, at the distant end from second clutch 75, so as to be movable in the axial direction, and rotates together with the rotation of second main shaft 72.

Specifically, spline gear 722 is attached to second main shaft 72, so as to be able to slide in the axial direction while its rotation with respect to second main shaft 72 is regulated, by splines arranged along the axial direction on the outer periphery of the front end of second main shaft 72, and meshes with fourth gear 84 of drive shaft 73. This spline gear 722 is coupled to shift fork 143, and moves on second main shaft 72 in the axial direction through movement of shift fork 143.

Spline gear 722 moves toward sixth gear 86 on second main shaft 72 and engages with sixth gear 86, and regulates turning (idling) about the axis of sixth gear on second main shaft 72. Through the engagement of spline gear 722 with sixth gear 86, sixth gear 86 is fixed to second main shaft 72, and is made integrally rotatable together with the rotation of second main shaft 72.

Meanwhile, the following gears are arranged on drive shaft 73 in order from the first clutch 74 side: first gear 81, spline gear (fifth-equivalent gear) 731, third gear 83, fourth gear 84, spline gear (sixth-equivalent gear) 732, second gear 82, and sprocket 76.

On drive shaft 73, first gear 81, third gear 83, fourth gear 84, and second gear 82 are provided rotatably about drive shaft 73 in a state in which their movement in the axial direction of drive shaft 73 is inhibited.

Spline gear (fifth-equivalent gear) 731 is attached to drive shaft 73 so as to be able to slide in the axial direction while its rotation is regulated by spline engagement. That is to say, spline gear 731 is attached so as to be movable in a sliding direction with respect to drive shaft 73, and also rotates together with drive shaft 73.

This spline gear 731 is coupled to shift fork 141, and moves on drive shaft 73 in the axial direction through the movement of shift fork 141.

Spline gear (sixth-equivalent gear) 732 is attached to drive shaft 73 so as to be able to slide in the axial direction while its turning is regulated by spline engagement. That is to say, spline gear (sixth-equivalent gear) 732 is attached so as to be movable in a sliding direction with respect to drive shaft 73, and also rotates together with drive shaft 73. This spline gear 732 is coupled to shift fork 144, and moves on drive shaft 73 in the axial direction through the movement of shift fork 144.

Sprocket 76, which rotates integrally together with the rotation of drive shaft 73, is provided at one end of drive shaft 73, here, the end located on the second clutch 75 side, and chain 13 in FIG. 1 is attached to sprocket 76.

These spline gears 712, 722, 731, and 732 function as transmission gears, and also function as dog selectors. Spline gears 712, 722, 731, and 732 are coupled by a dog mechanism to respective transmission gears (first gear 81 through sixth gear 86) that are adjacent in the axial direction by moving in the axial direction. That is to say, mutually fitting concave and convex portions are arranged on mutually opposing surfaces of spline gears 712, 722, 731, and 732 and transmission gears adjacent in the axial direction, and both gears rotate integrally through the fitting together of the concave and convex sections.

A description will now be given of the gear positions from first gear through sixth gear with gears 711, 721, 85, 86, 712, and 722 placed on first and second main shafts 71 and 72 and gears 81, 82, 731, 732, 83, and placed on drive shaft 73.

In the first gear position, spline gear (third-equivalent gear) 712 on first main shaft 71 is distanced from fifth gear 85, and meshes with third gear on drive shaft 73. Also, spline gear (fifth-equivalent gear) 731 on drive shaft 73 moves toward first gear 81 and is distanced from third gear 83, and fits together and coupled with first gear 81. As a result of this structure and arrangement, first gear 81 is placed in a state in which it is fixed integrally to drive shaft 73 via spline gear 731. At this time, third gear 83 meshing with spline gear 712 of first main shaft 71 and fifth gear 85 meshing with spline gear 731 of drive shaft 73 enter a state in which they idle about the respective axes.

In the second gear position, spline gear (fourth-equivalent gear) 722 on second main shaft 72 is distanced from sixth gear 86, and meshes with fourth gear on drive shaft 73. Also, spline gear (sixth-equivalent gear) 732 on drive shaft 73 moves toward second gear 82 and is distanced from fourth gear 84, and fits together and coupled with second gear 82. As a result of this structure and arrangement, second gear 82 is placed in a state in which it is fixed integrally to drive shaft 73 via spline gear 732. At this time, fourth gear 84 meshing with spline gear 722 of second main shaft 72 and sixth gear 86 meshing with spline gear 732 of drive shaft 73 enter a state in which they idle about the respective axes.

In the third gear position, spline gear (third-equivalent gear) 712 on first main shaft 71 is distanced from fifth gear 85, and meshes with third gear on drive shaft 73. Also, spline gear (fifth-equivalent gear) 731 on drive shaft 73 moves toward third gear 83 and is distanced from first gear 81, and fits together and is coupled with third gear 83. As a result of this structure and arrangement, third gear 83 is placed in a state in which it is fixed integrally to drive shaft 73 via spline gear 731. At this time, first gear 81 meshing with fixed gear 711 of first main shaft 71 and fifth gear 85 meshing with spline gear 731 of drive shaft 73 enter a state in which they idle about the respective axes.

In the fourth gear position, spline gear (fourth-equivalent gear) 722 on second main shaft 72 is distanced from sixth gear 86, and meshes with fourth gear on drive shaft 73. Also, spline gear (sixth-equivalent gear) 732 on drive shaft 73 moves toward fourth gear 84 and is distanced from second gear 82, and fits together and is coupled with fourth gear 84. As a result of this structure and arrangement, fourth gear 84 is placed in a state in which it is fixed integrally to drive shaft 73 via spline gear 732. At this time, second gear 82 meshing with fixed gear 721 of second main shaft 72 and sixth gear 86 meshing with spline gear 732 to drive shaft 73 enter a state in which they idle about the respective axes.

In the fifth gear position, spline gear (third-equivalent gear) 712 on first main shaft 71 moves toward fifth gear 85 and is coupled by fitting together with fifth gear 85, and that fifth gear 85 is placed in a state in which it is fixed integrally to the first main shaft via spline gear 712. Also, spline gear (fifth-equivalent gear) 731 on drive shaft 73 is distanced from both first gear 81 and third gear 83, and meshes with fifth gear 85 at a position at which it is not coupled to either. At this time, first gear 81 and third gear 83 on drive shaft 73 meshing with fixed gear 711 and spline gear 712 of first main shaft 71 enter a state in which they idle about the axis of drive shaft 73.

In the sixth gear position, spline gear (fourth-equivalent gear) 722 on second main shaft 72 moves toward sixth gear 86 and is coupled by fitting together with sixth gear 86, and that sixth gear 86 is placed in a state in which it is fixed integrally to second main shaft 72 via spline gear 722. Also, spline gear 732 on drive shaft 73 is distanced from both second gear 82 and fourth gear 84, and meshes with sixth gear 86 at a position at which it is not coupled to either. At this time, second gear 82 and fourth gear 84 on drive shaft meshing with fixed gear 721 and spline gear 722 of second main shaft 72 enter a state in which they idle about the axis of drive shaft 73.

Thus, gear shifting is performed in transmission by having spline gears 712, 722, 731, and 732 of transmission mechanism 700 moved as appropriate in the axial direction by shift forks 141 through 144.

Next, a description will be given of shift mechanism 701 that performs gear shifting by moving spline gears 712, 722, 731, and 732 of transmission mechanism 700 in the axial direction via shift forks 141 through 144.

(2-2) Shift Mechanism of Transmission

Shift mechanism 701 shown in FIG. 2 has elongated shift forks 141 through 144 coupled to spline gears 731, 712, 722, and 732 at the front end, cylindrical shift cam that has its rotation axis placed parallel or substantially parallel to first and second main shafts 71 and 72 and drive shaft 73, and moves shift forks 141 through 144 in the axial direction of that rotation axis by rotating, shift cam drive unit 800 that provides rotational driving of shift cam 14, motor 8, and transmission mechanism 41 that couples motor 8 to shift cam drive unit 800 and transfers the driving force of motor 8.

Shift forks 141 through 144 are installed between spline gears 731, 712, 722, and 732 and shift cam 14, and are placed distanced from each other in the axial direction of first and second main shafts 71 and 72, drive shaft 73, and shift cam 14. These shift forks 141 through 144 are arranged so as to be parallel or substantially parallel to each other, and are each placed movably in the axial direction of the rotation axis of shift cam 14.

Shift forks 141 through 144 have pin sections at the base end, placed so as to be movable respectively within four cam grooves 14a through 14d provided in the outer periphery of shift cam 14. That is to say, shift forks 141 through 144 are follower members of shift cam 14, which is the driving source, and slide in the axial direction of first and second main shafts 71 and 72 and drive shaft 73 in accordance with the shape of cam grooves 14a through 14d of shift cam 14. By this sliding movement, spline gears 731, 712, 722, and 732 coupled to the front end each move in the axial direction on shafts passing through the respective inner diameters.

Shift cam 14 is rotated by the driving force of motor 8 transferred to shift cam drive unit 800 via drive mechanism 41, and through this rotation, at least one of shift forks 141 through 144 is moved in accordance with the shape of cam grooves 14a through 14d.

By shift forks 141 through 144 that move in response to the rotation of shift cam 14 having cam grooves 14a through 14d, a spline gear coupled to a moved shift fork moves, and a gear shift of transmission 7 (transmission mechanism 700) is performed.

In this preferred embodiment, when the rider depresses the shift-up button or shift-down button of shift switch 15, a signal indicating that fact (hereinafter referred to as a "shift signal") is output from shift switch 15 to ECU 10. Based on the input shift signal, ECU 10 controls first and second clutch actuators and 78 and motor 8. By this control, either first clutch 74 or second clutch 75, or both first and second clutches 74 and 75, is/are disengaged, shift cam 14 rotates, and a gear shift in transmission 7 (transmission mechanism 700) is performed.

Transmission 7 of this preferred embodiment is equipped with first clutch 74 that inputs rotation power transferred from crankshaft 60 to first main shaft 71 and outputs driving force to a driving wheel via an odd-numbered transmission gear mechanism (gears 81, 83, 85, 711, 712, and 731) set as odd-numbered transmission gears, and second clutch 75 that inputs rotation power transferred from crankshaft 60 to second main shaft 72 and outputs driving force to rear wheel 12 via an even-numbered transmission gear mechanism (gears 82, 84, 86, 721, 722, and 732) set as even-numbered transmission gears.

First clutch 74 and second clutch 75 are placed in approximately symmetrical positions approximately equidistant from a central plane passing through the lengthwise center of crankshaft 60 and perpendicular or substantially perpendicular to crankshaft 60, and have power transferred to them from each end of crankshaft 60 respectively. First main shaft 71 and second main shaft 72 are placed in positions on the same axis line parallel or substantially parallel to crankshaft 60, with transmitting portions of driving force when output to the driving wheel via an odd-numbered transmission gear mechanism and even-numbered transmission gear mechanism respectively not overlapping coaxially on first main shaft 71 and second main shaft 72. The outer axial diameters of the driving force transmitting portions on first main shaft 71 and second main shaft 72 are the same.

Consequently, according to this preferred embodiment, unlike the case of a conventional configuration, first main shaft 71 and second main shaft are not arranged as a double-tube structure, and it is not necessary to make one of the diameter of first main shaft 71 and the diameter of second main shaft 72 larger than the other. Accordingly, it is not necessary to make the diameters of gears (fixed gears, transmission gears, and spline gears) attached to first main shaft 71 and second main shaft 72 larger.

Also, since the diameters of gears provided on first and second main shafts 71 and 72 can be made smaller, the diameters of gears (gears provided on drive shaft 73) that mesh with those gears can be made smaller. As a result, the distance between first and second main shafts and 72 and drive shaft 73 can be made smaller, and transmission 7 can be reduced in size.

In particular, with transmission 7 of an engine unit of this preferred embodiment, since first main shaft 71 and second main shaft 72 are placed rotatably on the same axis line and facing the respective end surfaces, they are separated from each other, and when mounted on a motorcycle, main shafts having the same outer diameter as an existing main shaft can be used as first main shaft and second main shaft 72.

Also, since first main shaft 71 and second main shaft 72 are provided on approximately the same axis line, the distance between first main shaft 71 and drive shaft 73, or the distance between second main shaft 72 and drive shaft 73, does not become larger.

As a result, an engine unit having transmission can be mounted on an existing motorcycle without changing the distances between the crankshaft, main shafts, and drive shaft in that motorcycle. Therefore, a drive unit having transmission 7 can be mounted without constraints on the vehicle dimensions of an existing motorcycle and without changing the wheel base of the motorcycle, and can be mounted without significantly changing the frame and so forth of the motorcycle.

Also, power transfer portions on first main shaft and second main shaft 72 do not overlap coaxially.

That is to say, the freedom of gear ratio settings for gears 711, 85, 712, 721, 86, and 722 placed on first main shaft 71 and second main shaft 72, and gears 81, 731, 83, 82, 732, and 84 placed on drive shaft 73 that mesh with those gears, is not restricted.

Furthermore, in this preferred embodiment, first clutch 74 and second clutch 75 are placed so as to face each other, and first and second main shafts 71 and 72 are provided between first clutch 74 and second clutch 75. As a result, the center of motorcycle 100 in the lateral direction and the position of the center of gravity of transmission mechanism 700 are not significantly distanced from each other.

Therefore, even if transmission 7, that is, an engine unit, is mounted on motorcycle 100, the weight of motorcycle 100 does not deviate to either the left or right and the lateral balance of motorcycle 100 can easily be stabilized, and the driving feeling of motorcycle 100 can be improved.

Also, first clutch 74 and second clutch 75 are placed in approximately symmetrical positions approximately equidistant from a central plane passing through the lengthwise center of crankshaft 60 and perpendicular or substantially perpendicular to crankshaft 60. To be specific, first clutch 74 and second clutch 75 are connected to the ends farthest from each other (the base ends) of first main shaft 71 and second main shaft 72, respectively, placed on the same axis line parallel or substantially parallel to crankshaft 60, and are placed at positions separated by a predetermined distance perpendicular or substantially perpendicular to the axial direction of crankshaft 60 with respect to either end of crankshaft 60 respectively.

Figure 17:
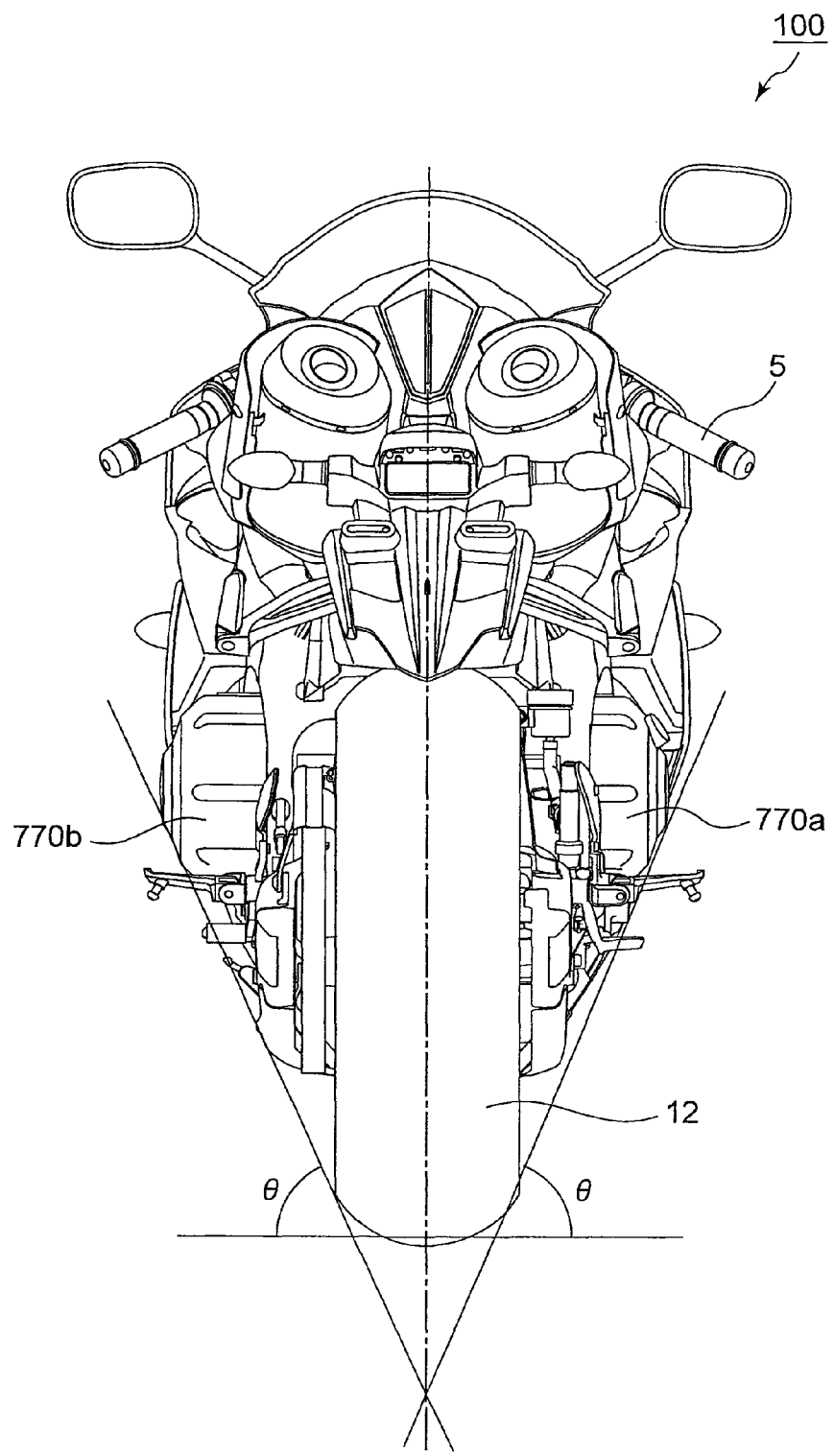
FIG. 17 is a rear view of a vehicle in which an engine unit according to a preferred embodiment of the present invention is mounted.

As a result, the degrees of projection in the vehicle width direction of parts (clutch case side cover sections 770a and 770b) covering first clutch 74 and second clutch 75 in the chassis of the engine unit accommodating first clutch 74 and second clutch 75 are approximately equal lengths with respect to a central plane passing through the lengthwise center and perpendicular or substantially perpendicular to the axis of crankshaft 60 of the engine unit. Consequently, the engine unit can be mounted on motorcycle 100 with a perpendicular or substantially perpendicular plane passing through the approximate lengthwise center of crankshaft 60 in the engine unit aligned with the central plane of the body of motorcycle 100. Thus, as shown in FIG. 17, bank angle θ defined by the degree of projection of each of clutch covers 770a and 770b covering first clutch 74 and second clutch 75 from their respective sides can also be made narrow, and the posture of the rider is not constrained.

Also, in this preferred embodiment, first main shaft 71, second main shaft 72, first clutch 74, and second clutch 75 are placed higher than crankshaft 60 and drive shaft 73. In this case, the width of the lower portion of motorcycle 100 can be prevented from becoming large. As a result, the bank angle of motorcycle 100 can be made large, and the driving feeling of motorcycle 100 can be further improved.

Furthermore, since heavy first clutch 74 and second clutch 75 are placed in the engine unit in approximately laterally symmetrical positions about the center of gravity of the engine unit, it is not necessary to make the shape of the frame of motorcycle 100 in which the engine unit is mounted different between the left and the right, and good lateral rigidity can easily be provided in the frame.

Moreover, since first main shaft 71 and second main shaft 72 are provided separately, if one of the two power transfer paths (the path via first main shaft 71 and the path via second main shaft 72) that transfer torque from engine 6 to drive shaft 73 cannot be used, driving force can be output to rear wheel 12 using the other path.

Also, in this preferred embodiment, first input gear 40 meshes with crank web 61a placed at one end of crankshaft 60, and second input gear 50 meshes with crank web 61b placed at the other end of crankshaft 60. In this case, it is possible to prevent the center of gravity of engine 6 and the center of gravity of transmission mechanism 700 being significantly distanced from each other. As a result, the lateral balance of motorcycle 100 can be still more easily stabilized.

Furthermore, in this preferred embodiment, sprocket 76 is placed so that portion of sprocket 76 is in an area between second input gear 50 and second gear arranged in the lateral direction. In this case, sprocket 76 can be provided on drive shaft 73 without the center of transmission mechanism 700 in the lateral direction being significantly spaced from the center of motorcycle 100 in the lateral direction. As a result of this structure and arrangement, the width of motorcycle 100 can be prevented from becoming overly large.

Moreover, as shown in FIG. 3, sprocket 76 is placed so as to be exposed outside drive unit case 920. Specifically, sprocket 76 is attached to one end (the left end) of drive shaft 73 that projects rotatably from one side (the left side) of drive unit case 920. That is to say, sprocket 76 itself is placed in a state in which it projects externally on one side (the left side) of engine unit chassis 920. Drive unit case 920 accommodates crankshaft 60, first main shaft 71, an odd-numbered transmission gear mechanism (gears 81, 83, 85, 711, 712, and 731), first clutch 74, second main shaft 72, an even-numbered transmission gear mechanism (gears 82, 84, 86, 721, 722, and 732), second clutch 75, and drive shaft 73.

In this drive unit case 920, as shown in FIG. 3, second main shaft 72 is placed such that its one (left) end, that is, base end 72a, projects toward one (left) side from drive unit case 920 beyond one (left) end of drive shaft 76.

Second clutch 75 is connected detachably to one (left) end, that is, base end 72a, of second main shaft 72, at a position overlapping portion of sprocket 76 sideways with respect to the axis (on the left side) of drive shaft 73. A power transmitting portion that meshes with second input gear 50 connected to second clutch 75 and transfers rotation power from the crankshaft 60 side, is provided in throughhole 940 that penetrates the junction section between the bottom surface (partition member) of bell housing 930 and drive unit case 920. Consequently, when second clutch 75 is removed from second main shaft 72, second input gear 50 is likewise moved in the axial direction, so that the meshed state of second clutch 75 with the power transmitting portion is disengaged and second clutch 75 can be easily removed.

Thus, second clutch 75 that is placed on the side sprocket 76 is placed, is accommodated in a clutch case defined by clutch cover 770b that covers from the side, and bell housing (casing member) 930 that is provided to partition between second clutch 75 and sprocket 76.

Furthermore, bell housing 930 is detachably attached to mission case 770 and covers from the side a drive output portion defined by drive sprocket 76 and drive chain 13 that is wound around sprocket 76 and guided rearward of the vehicle.

Thus, as shown in FIG. 14, removing clutch cover 770b, second clutch 75, and bell housing 930 enables sprocket 76 to be exposed on one side of the vehicle, and maintenance of drive chain 13 and sprocket 76 can be performed while an engine unit including engine 6, is mounted on vehicle (motorcycle) 100.

Furthermore, in the engine unit, clutch cover 770a that covers first clutch 74 from the side can be removed from drive unit case 920. Also, clutch cover 770b that covers second clutch 75 from the side can be removed from drive unit case 920 to which bell housing 930 is attached.

Thus, first clutch 74 and second clutch 75 can be exposed on both sides of vehicle (motorcycle) 100 while the engine unit is mounted on the vehicle, and clutch maintenance can be performed in the same way as with a conventional motorcycle equipped with a single clutch.

That is to say, even though the configuration is equipped with two clutches as opposed to the single clutch of a conventional motorcycle, clutch maintenance can be performed in the same way as with a conventional motorcycle.

Also, in this preferred embodiment, in the standard state of each gear position, either the odd-numbered gear group or the even-numbered gear group is held in a neutral position.

This enables motorcycle 100 to be driven while first and second clutches 74 and 75 are both connected.

Therefore, when motorcycle 100 is running in a certain gear position, it is not necessary to keep first and second clutch actuators 77 and 78 driven. This makes it possible to extend the life of first and second clutch actuators 77 and 78, and release bearings 70a and 80a, and also enables control of first and second clutch actuators 77 and 78 by ECU 10 to be simplified.

Also, in this preferred embodiment, when the gear position is switched, first and second clutches 74 and 75 are both placed in a half-clutch state. In this case, torque of sprocket 76 can be prevented from changing suddenly. In this case, sprocket 76 torque can be prevented from changing rapidly. As a result of this structure and arrangement, the driver feeling when the motorcycle changes the speed can be improved. Also, when the gear position is switched, transfer of torque from crankshaft 60 to sprocket 76 is not blocked, making a quick and smooth gear change operation possible.

Gear reduction ratios of first input gear 40 and second input gear 50 may be the same or may be different.

If the gear reduction ratio of first input gear 40 and the gear reduction ratio of second input gear 50 are made the same, the clutch capacity (the maximum torque at which clutch slippage is prevented) of first clutch 74 and the clutch capacity of second clutch 75 can be made equal.

As a result of this structure and arrangement, commonality of parts can be achieved for first clutch 74 and second clutch 75, and the production cost of motorcycle 100 can be reduced.

On the other hand, if the gear reduction ratio of first input gear 40 and the gear reduction ratio of second input gear 50 are made different, the difference between the gear ratio of torque transferred to drive shaft 73 via first clutch 74 and the gear ratio of torque transferred to drive shaft 73 via second clutch 75 can be made large. As a result of this structure and arrangement, the range of gear ratios in transmission mechanism 700 can be increased, and the running performance of motorcycle 100 is improved.

Also, the clutch capacity of the clutch that is not normally used when motorcycle 100 starts moving, that is, second clutch 75, may be made smaller than the clutch capacity of first clutch 74. In this case, it is possible to make transmission mechanism 700 smaller and lighter. Moreover, the moment of inertia about the axis extending in the front-back direction of transmission mechanism 700 can be made smaller, improving the running performance of motorcycle 100.

In the above-described preferred embodiment, torque of crankshaft 60 is transferred to first and second clutches 74 and 75 via crank webs 61a and 61b, but the method of torque transfer from crankshaft 60 to first and second clutches 74 and 75 is not limited to the above example. For example, two gears for torque transfer may be provided on crankshaft 60, and torque of crankshaft 60 may be transferred to first and second clutches 74 and via those two gears.

Thus, with an engine unit according to the present preferred embodiment, it is possible to make an engine unit small, and, even when clutches and sprocket wound by a drive chain are placed close on the same, one side with respect to the center axis of the vehicle, it is possible to perform maintenance of the clutches and sprocket easily.

Furthermore, with an engine unit according to the present preferred embodiment, in transmission 7, lubricating oil that is supplied in the space inside flange section 773 is branched between cavity section 781 and cavity section 782 and then supplied to first clutch 74 and second clutch 75. As a result of this structure and arrangement, lubricating oil can be supplied equal between first clutch 74 and second clutch 75. In this case, inadequate lubrication of either one of first and second clutches 74 and 75 can be prevented, and an improvement in the durability of first and second clutches 74 and 75 can be achieved.

In the above preferred embodiments, a case has been described in which the engine unit is applied to a motorcycle as an example of a vehicle, but the present invention is by no means limited to this, and may also be applied to other vehicles, such as a 3-wheeled motor vehicle or a 4-wheeled motor vehicle.

In the above preferred embodiments, transmission 7 has been described that enables the gear ratio to be changed in six steps (first gear through sixth gear), but the gear rations of transmission 7 may also be set to five steps or less, or to seven steps or more. The number of gears provided on first main shaft 71, second main shaft 72, and drive shaft 73 is adjusted appropriately according to the number of gear ratio steps set in transmission 7.

Also, in the above preferred embodiments, first clutch 74 and second clutch 75 are assumed to be of wet multi-plate friction transmission type, but they may be of single plate, multi-plate, wet, or dry type, and may also be centrifugal clutches or the like.

An engine unit according to the preferred embodiments of the present invention provides advantages that it can be made small, and that, even when clutches and sprocket wound by a drive chain are placed close on the same, one side with respect to the center axis of the vehicle, maintenance of clutches and sprocket can be performed easily, and therefore the engine unit according to the present invention is suitable for an engine unit to be mounted on a motorcycle.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. An engine unit comprising:
   a crankshaft arranged in an approximately lateral direction of a vehicle in which the engine unit is mounted;
   a drive shaft arranged parallel or substantially parallel to the crankshaft and arranged to output a drive to a driving wheel via a sprocket provided at one end of the drive shaft in the lateral direction;
   a main shaft aligned parallel or substantially parallel to the drive shaft, and arranged to rotate by a rotation power transferred from the crankshaft and to provide an output to the drive shaft via a transmission gear mechanism;
   a clutch arranged to connect and disconnect the rotation power transferred from the crankshaft to the main shaft; and
   a drive unit case in which the crankshaft, the main shaft, the transmission gear mechanism, and the drive shaft are provided in a rotatable fashion; wherein
   the main shaft is provided in the drive unit case such that one end of the main shaft projects from the drive unit case toward the one end of the drive shaft and beyond the one end of the drive shaft;
   the one end of the main shaft and the one end of the drive shaft are located at a same side of the drive unit case; and
   the clutch is detachably connected to the one end of the main shaft at a position radially overlapping with at least a portion of the sprocket.

2. The engine unit according to claim 1, wherein a partition member is detachably arranged in the drive unit case, the partition member penetrating the one end of the main shaft between the clutch and the sprocket that are spaced apart in an axial direction, defining a portion of a case accommodating the clutch, and partitioning the clutch and the sprocket.

3. The engine unit according to claim 2, wherein the one end of the main shaft extends through the partition member.

4. The engine unit according to claim 3, wherein
   at the one end of the main shaft, an input gear that rotates coaxially with the main shaft and transfers rotation power from the crankshaft to the clutch is detachably attached between the clutch and the partition member; and
   a throughhole is provided in a junction section between the partition member and the drive unit case such that a crank web of the crankshaft meshes with the input gear and transfers rotation power from the crankshaft.

5. A vehicle comprising the engine unit according to claim 1.

6. A motorcycle comprising the engine unit according to claim 1.

\* \* \* \* \*